United States Patent
Kabzan et al.

(10) Patent No.: US 12,030,485 B2
(45) Date of Patent: Jul. 9, 2024

(54) VEHICLE OPERATION USING MANEUVER GENERATION

(71) Applicant: Motional AD LLC, Boston, MA (US)

(72) Inventors: Juraj Kabzan, Singapore (SG); Emilio Frazzoli, Newton, MA (US)

(73) Assignee: Motional AD LLC, Boston, MA (US)

( * ) Notice: Subject to any disclaimer, the term of this patent is extended or adjusted under 35 U.S.C. 154(b) by 387 days.

(21) Appl. No.: 17/544,526

(22) Filed: Dec. 7, 2021

(65) Prior Publication Data
US 2022/0234575 A1    Jul. 28, 2022

Related U.S. Application Data

(60) Provisional application No. 63/142,882, filed on Jan. 28, 2021.

(51) Int. Cl.
*B60W 60/00* (2020.01)
*B60W 30/09* (2012.01)
(Continued)

(52) U.S. Cl.
CPC ........ *B60W 30/09* (2013.01); *B60W 30/0956* (2013.01); *B60W 40/02* (2013.01);
(Continued)

(58) Field of Classification Search
CPC .... B60W 30/09; B60W 30/095; B60W 60/00; B60W 40/02; G05D 1/02; G08G 1/16
See application file for complete search history.

(56) References Cited

U.S. PATENT DOCUMENTS

| 11,079,764 B2 | 8/2021 | Nister et al. |
| 11,613,307 B2* | 3/2023 | Yamashita ............... B62D 1/06 701/41 |

(Continued)

FOREIGN PATENT DOCUMENTS

| EP | 3647735 | 5/2020 |
| EP | 4013654 | 6/2022 |

(Continued)

OTHER PUBLICATIONS

[No. Author Listed], "Surface Vehicle Recommended Practice: Taxonomy and Definitions for Terms Related to Driving Automation Systems for On-Road Motor Vehicles," SAE International, Standard J3016, Sep. 30, 2016, 30 pages.

*Primary Examiner* — Tan Q Nguyen
(74) *Attorney, Agent, or Firm* — Fish & Richardson P.C.

(57) ABSTRACT

Multiple trajectories for a vehicle are generated based on a road segment. Sensor data is received from at least one sensor. The vehicle is traveling the road segment in accordance with a first trajectory of the multiple trajectories. A potential collision is predicted between the vehicle and an object based on the sensor data and the first trajectory. A set of constraints is determined to avoid the potential collision. The set of constraints is determined based on the sensor data. A maneuver is determined for the vehicle by superimposing each constraint of the set of constraints on each other constraint of the set of constraints. The maneuver includes a second trajectory independent of the multiple trajectories. Instructions are transmitted to a control circuit of the vehicle to override the first trajectory and traverse the road segment according to the second trajectory to perform the maneuver.

20 Claims, 17 Drawing Sheets

(51) Int. Cl.
  *B60W 30/095* (2012.01)
  *B60W 40/02* (2006.01)
  *G05D 1/02* (2020.01)

(52) U.S. Cl.
  CPC .... *B60W 60/0013* (2020.02); *B60W 60/0016* (2020.02); *B60W 2552/53* (2020.02)

(56) References Cited

U.S. PATENT DOCUMENTS

| | | | |
|---|---|---|---|
| 2011/0196592 A1* | 8/2011 | Kashi | B60W 50/085 |
| | | | 701/96 |
| 2014/0350836 A1* | 11/2014 | Stettner | G01S 7/489 |
| | | | 356/4.01 |
| 2017/0277192 A1 | 9/2017 | Gupta et al. | |
| 2017/0305347 A1 | 10/2017 | Turk | |
| 2018/0281785 A1 | 10/2018 | Berntorp et al. | |
| 2019/0016339 A1 | 1/2019 | Ishioka | |
| 2019/0220015 A1 | 7/2019 | Phillips et al. | |
| 2019/0291748 A1 | 9/2019 | Takahashi et al. | |
| 2019/0369637 A1 | 12/2019 | Shalev-Shwartz et al. | |
| 2019/0391580 A1 | 12/2019 | Di Cairano et al. | |
| 2020/0139959 A1 | 5/2020 | Akella et al. | |
| 2020/0241541 A1 | 7/2020 | McCawley et al. | |
| 2021/0020045 A1 | 1/2021 | Huang et al. | |
| 2021/0078603 A1 | 3/2021 | Nakhaei Sarvedani et al. | |
| 2021/0158227 A1 | 5/2021 | Budzik et al. | |
| 2021/0300364 A1 | 9/2021 | Sadamura | |
| 2022/0176962 A1 | 6/2022 | Smith et al. | |
| 2022/0176995 A1 | 6/2022 | Subramanian et al. | |
| 2022/0234614 A1 | 7/2022 | Frazzoli et al. | |
| 2022/0234618 A1 | 7/2022 | Kabzan et al. | |

FOREIGN PATENT DOCUMENTS

| | | |
|---|---|---|
| GB | 2570887 | 8/2019 |
| JP | 3890996 | 3/2007 |
| JP | 2019-510674 | 4/2019 |
| KR | 10-2015-0086065 | 7/2015 |
| WO | WO 2018/073884 | 4/2018 |
| WO | WO 2020/035728 | 2/2020 |
| WO | WO 2020/057801 | 3/2020 |
| WO | WO 2020/062031 | 4/2020 |
| WO | WO 2021/030508 | 2/2021 |

* cited by examiner

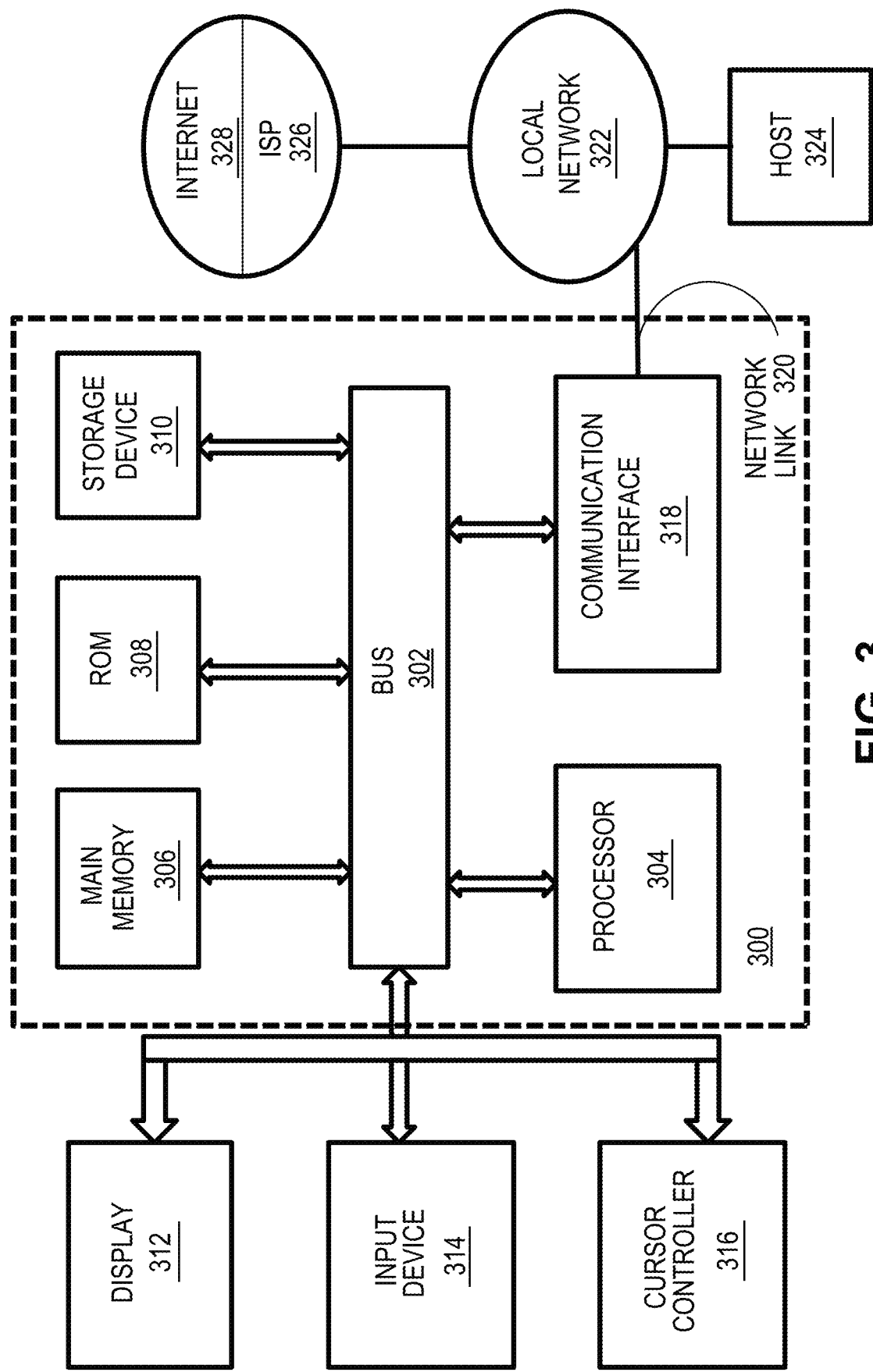

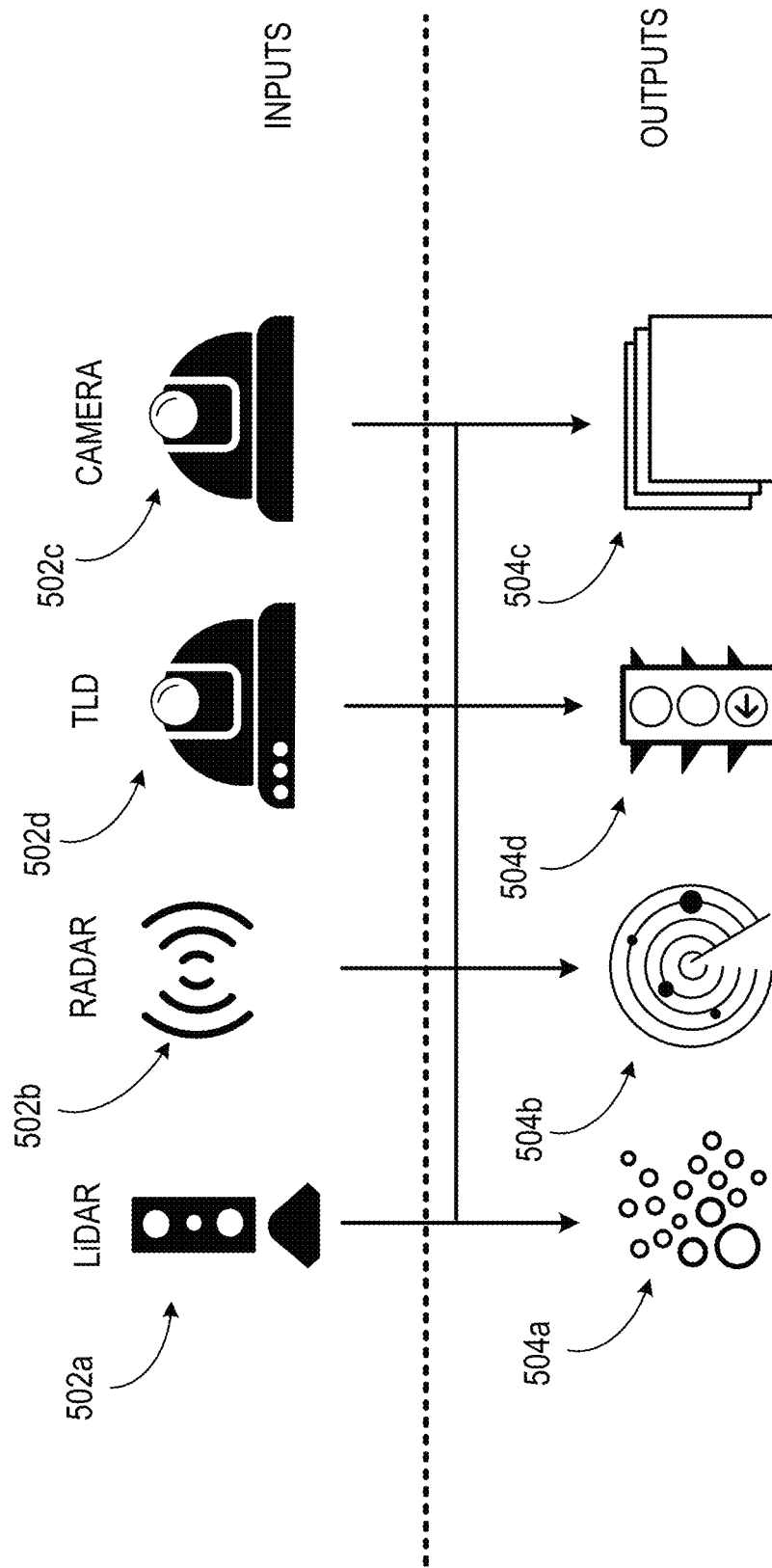

VEHICLE OPERATION USING MANEUVER GENERATION

RELATED APPLICATION

This application claims the benefit of U.S. Provisional Application Ser. No. 63/142,882, filed Jan. 28, 2021, the entire contents of which are incorporated herein by reference.

FIELD OF THE INVENTION

This description relates generally to operation of vehicles and specifically to vehicle operation using maneuver generation.

BACKGROUND

Operation of a vehicle from an initial location to a final destination often requires a user or a vehicle's decision-making system to select a route through a road network from the initial location to a final destination. The route may involve meeting objectives, such as not exceeding a maximum driving time. A complex route can require many decisions, making traditional algorithms for autonomous driving impractical.

SUMMARY

Methods, apparatus, and systems for vehicle operation using maneuver generation are disclosed. In an embodiment, at least one processor of a vehicle generates multiple trajectories for the vehicle based on a road segment traveled by the vehicle. The at least one processor receives sensor data from at least one sensor of the vehicle. The vehicle is traveling the road segment in accordance with a first trajectory of the multiple trajectories. The at least one processor predicts a potential collision between the vehicle and an object moving on the road segment based on the sensor data and the first trajectory. The at least one processor determines a set of constraints for the vehicle to avoid the potential collision. The set of constraints is determined based on the sensor data. The at least one processor determines a maneuver for the vehicle by superimposing each constraint of the set of constraints on each other constraint of the set of constraints. The maneuver includes a second trajectory independent of the multiple trajectories. The at least one processor transmits instructions to a control circuit of the vehicle to override the first trajectory and traverse the road segment according to the second trajectory to perform the maneuver.

In an embodiment, the set of constraints includes environmental constraints indicating at least one of a drivable area of the road segment or lane markings of the road segment.

In an embodiment, the set of constraints includes hard logical constraints that the AV must obey to avoid the potential collision. The AV can violate soft logical constraints to avoid the potential collision.

In an embodiment, the set of constraints includes station-based constraints that are parameterized, by the at least one processor, over time using the sensor data. Spatial-based constraints are parameterized, by the at least one processor, over station and time using the sensor data.

In an embodiment, determining the maneuver includes generating, by the at least one processor, a union of the station-based constraints and the spatial-based constraints to provide the maneuver.

In an embodiment, determining the set of constraints is performed at a first frequency and determining the maneuver to generate the second trajectory is performed at a second frequency higher than the first frequency.

In an embodiment, performing the maneuver comprises operating the vehicle to a particular location relative to the object.

In an embodiment, the at least one processor determines multiple homotopies. Each homotopy of the multiple homotopies includes a different respective combination of the set of constraints. Determining the maneuver is based on at least some of the multiple homotopies.

In an embodiment, the at least one processor predicts a motion of the vehicle on the road segment according to a degree of precision. The at least one processor determines that the vehicle can traverse the road segment in accordance with a subset of the multiple homotopies based on the predicted motion. Determining the maneuver is further based on the subset of the multiple homotopies.

In an embodiment, determining that the vehicle can traverse the road segment in accordance with the subset of the multiple homotopies includes generating, by the at least one processor, a decision graph based on the subset of the multiple homotopies. The graph includes multiple nodes. Each node corresponds to a different maneuver.

In an embodiment, determining the maneuver to generate the second trajectory includes assigning, by the at least one processor, a respective quality metric to each homotopy of the multiple homotopies. The at least one processor selects the second trajectory based on the respective quality metric.

In an embodiment, the respective quality metric is determined based on at least one of a predicted time for traversing the road segment in accordance with the each homotopy, a predicted safety of a passenger of the vehicle while traversing the road segment in accordance with the each homotopy, or a predicted comfort of the passenger while traversing the road segment in accordance with the each homotopy.

In an embodiment, performing the maneuver includes positioning, by the control circuit, the vehicle ahead of two moving objects while traversing the road segment.

In an embodiment, performing the maneuver includes positioning, by the control circuit, the vehicle behind two moving objects while traversing the road segment.

In an embodiment, performing the maneuver includes positioning, by the control circuit, the vehicle between two moving objects while traversing the road segment.

In an embodiment, superimposing each constraint of the set of constraints on each other constraint of the set of constraints includes sampling, by the at least one processor, each constraint of the set of constraints with respect to time in accordance with changes in the sensor data to provide the maneuver.

These and other aspects, features, and implementations can be expressed as methods, apparatus, systems, components, program products, means or steps for performing a function, and in other ways.

These and other aspects, features, and implementations will become apparent from the following descriptions, including the claims.

BRIEF DESCRIPTION OF THE DRAWINGS

FIG. 3 is a block diagram illustrating a computer system, in accordance with one or more embodiments.

FIG. 5 is a block diagram illustrating an example of inputs and outputs that may be used by a perception module, in accordance with one or more embodiments.

DETAILED DESCRIPTION

Figure 1:
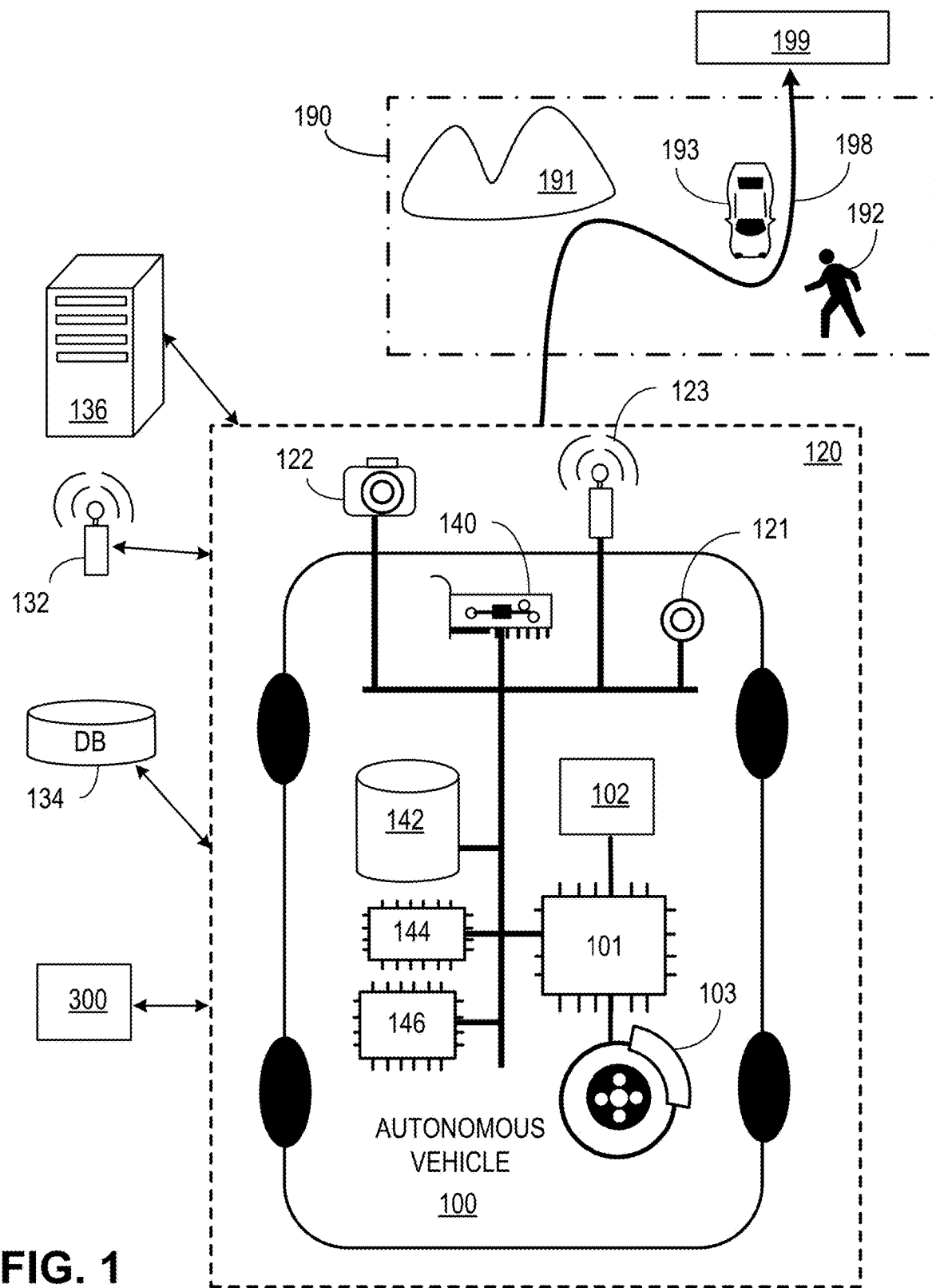
FIG. 1 is a block diagram illustrating an example of an autonomous vehicle (AV) having autonomous capability, in accordance with one or more embodiments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in an embodiment.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
    2. System Overview
    3. Autonomous Vehicle Architecture
    4. Autonomous Vehicle Inputs
    5. Autonomous Vehicle Planning
    6. Autonomous Vehicle Control
    7. Autonomous Vehicle Operation Using Maneuver Generation General Overview This document presents methods, systems, and apparatuses for operating an autonomous vehicle (AV) using maneuver generation. A planning module for the AV generates a graphical representation of the environment and the AV's sensor signal measurements (for example, speed and position). The nodes of the graphical representation denote a sample of the AV's decision space (for example, a set of maneuvers of the AV in relation to other vehicles and environmental constraints, such as the driveable area or lane markings. The edges of the graphical representation denote the different possible trajectories that the AV can follow to perform the different maneuvers.

The advantages and benefits of AV operation using maneuver generation include a reduction in the computational complexity of determining a trajectory for the AV. The need for a planning module to determine a trajectory in a brute force manner by generating a large number of candidate trajectories and evaluating each of the candidate trajectories is obviated. Using the embodiments disclosed herein, the planning module can reduce the search space by identifying a subset of the search space corresponding to feasible homotopies (e.g., combinations of constraints that the AV is capable of adhering to safely while traversing the route) and generating candidate trajectories only for that subset.

System Overview

FIG. 1 is a block diagram illustrating an example of an autonomous vehicle 100 having autonomous capability, in accordance with one or more embodiments.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to operate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle and may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings or having two lanes between the lane markings. A lane could also be interpreted in the absence of lane markings. For example, a lane may be defined based on physical features of an environment, e.g., rocks and trees along a thoroughfare in a rural area.

As used herein, "homotopy" means a subset of a set of constraints on a trajectory of an AV that the AV can adhere to while traversing a particular route.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "includes," and/or "including," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 300 described below with respect to FIG. 3.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Referring to FIG. 1, an AV system 120 operates the AV 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear velocity and acceleration, angular velocity and acceleration, and heading (e.g., an orientation of the leading end of AV 100). Example of sensors 121 are GNSS, inertial measurement units (IMU) that measure both vehicle linear accelerations and angular rates, wheel sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in an embodiment, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX, Wi-Fi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication interfaces 140 transmit data collected from sensors 121 or other data related to the operation of AV 100 to the remotely located database 134. In an embodiment, communication interfaces 140 transmit information that relates to teleoperations to the AV 100. In an embodiment, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data may be stored on the memory 144 on the AV 100, or transmitted to the AV 100 via a communications channel from the remotely located database 134.

Computing devices 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computing devices 146 for providing information and alerts to, and receiving input from, a user (e.g., an occupant or a remote user) of the AV 100. In an embodiment, peripherals 132 are similar to the display 312, input device 314, and cursor controller 316 discussed below in reference to FIG. 3. The coupling is wireless or wired. Any two or more of the interface devices may be integrated into a single device.

Example Cloud Computing Environment

Figure 2:
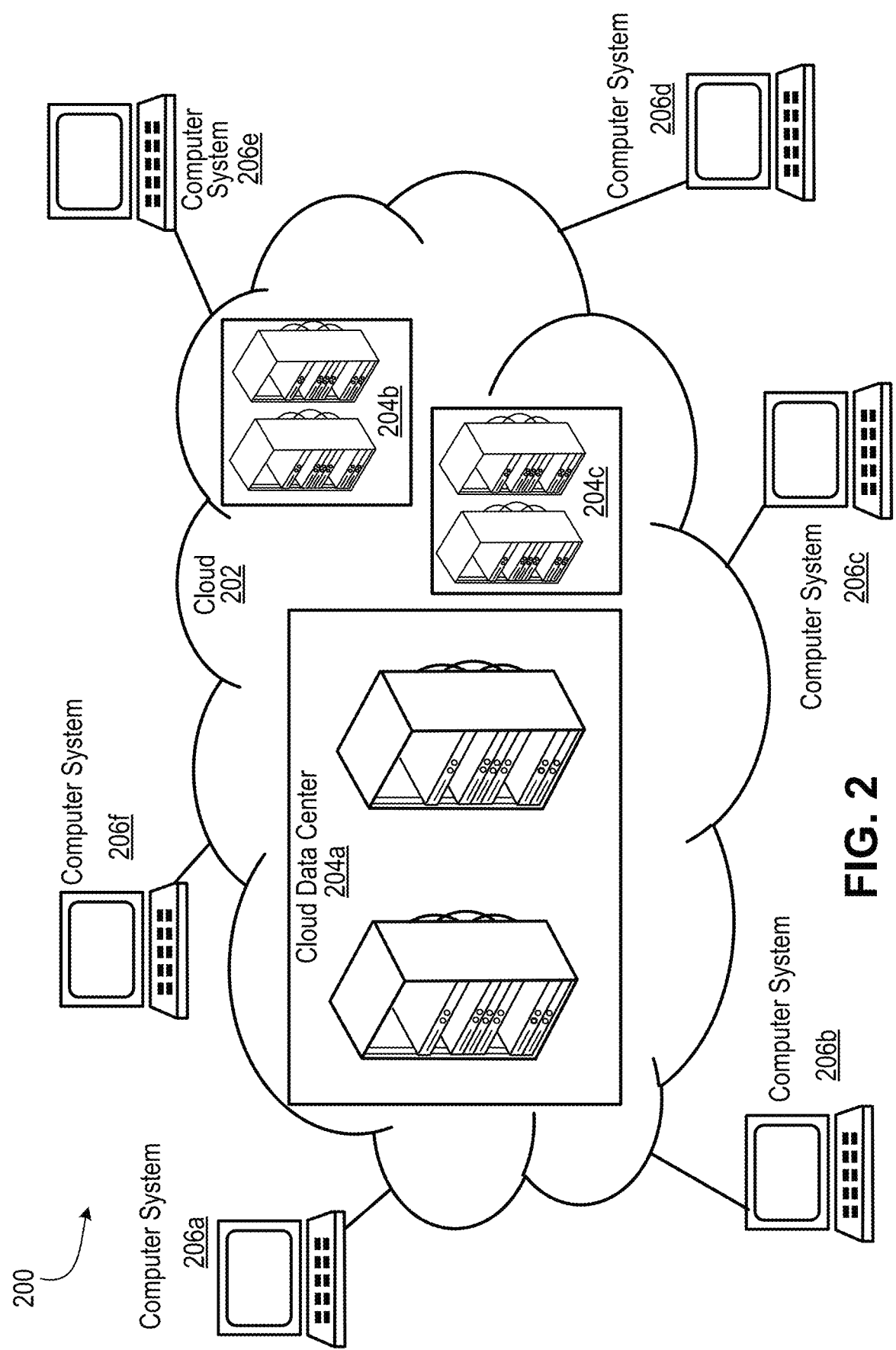
FIG. 2 is a block diagram illustrating an example "cloud" computing environment, in accordance with one or more embodiments.

FIG. 2 is a block diagram illustrating an example "cloud" computing environment, in accordance with one or more embodiments. Cloud computing is a model of service delivery for enabling convenient, on-demand network access to a shared pool of configurable computing resources (e.g. networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In an embodiment, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, Internet of Things (IoT) devices, autonomous vehicles (including, cars, drones, shuttles, trains, buses, etc.) and consumer electronics. In an embodiment, the computing systems 206a-f are implemented in or as a part of other systems.

Computer System

FIG. 3 is a block diagram illustrating a computer system 300, in accordance with one or more embodiments. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a hardware processor 304 coupled with a bus 302 for processing information. The hardware processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that include the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 may optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic, or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4A:
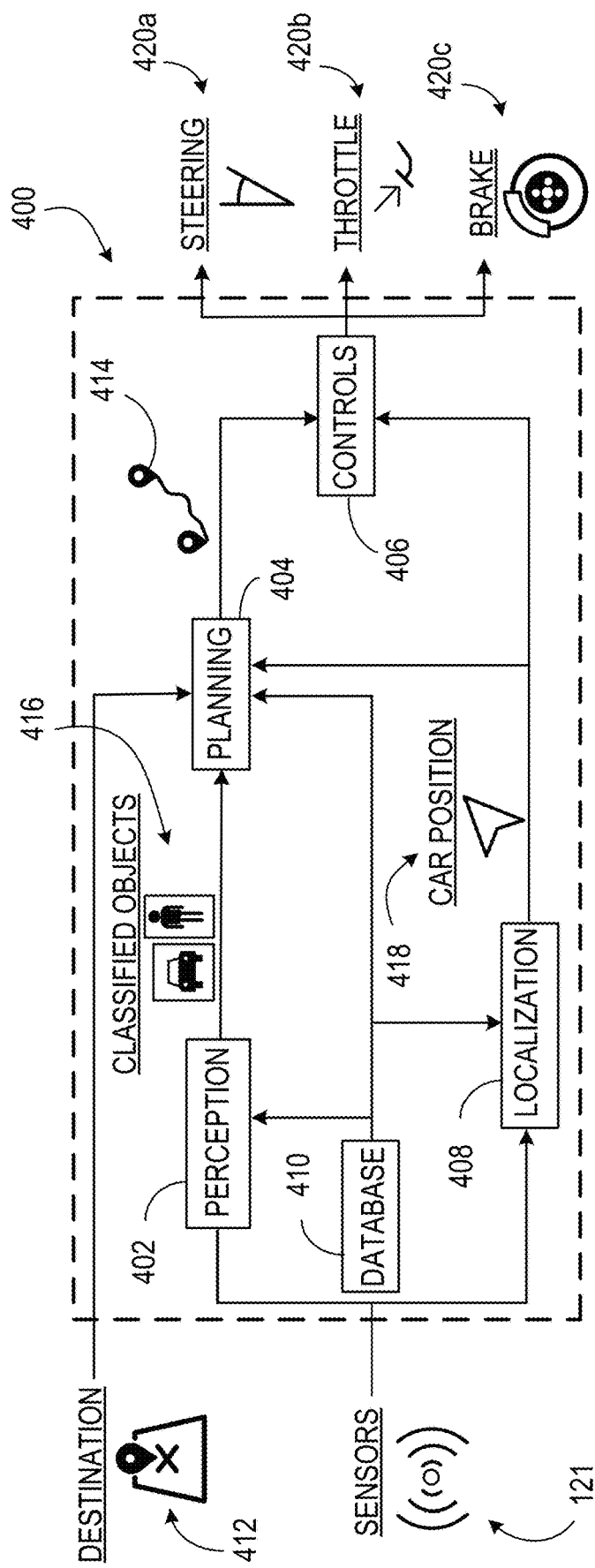
FIG. 4A is a block diagram illustrating an example architecture for an AV, in accordance with one or more embodiments.

FIG. 4A is a block diagram illustrating an example architecture 400 for an autonomous vehicle (e.g., the AV 100 shown in FIG. 1), in accordance with one or more embodiments. The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the AV 100. Together, the modules 402, 404, 406, 408, and 410 may be part of the AV system 120 shown in FIG. 1. In an embodiment, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things).

In use, the planning module 404 receives data representing a destination 412 and determines data representing a trajectory 414 (sometimes referred to as a route) that can be traveled by the AV 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a global navigation satellite system (GNSS) unit and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types.

The control module 406 receives the data representing the trajectory 414 and the data representing the AV position 418 and operates the control functions 420a-c (e.g., steering, throttling, braking, ignition) of the AV in a manner that will cause the AV 100 to travel the trajectory 414 to the destination 412. For example, if the trajectory 414 includes a left turn, the control module 406 will operate the control functions 420*a-c* in a manner such that the steering angle of the steering function will cause the AV 100 to turn left and the throttling and braking will cause the AV 100 to pause and wait for passing pedestrians or vehicles before the turn is made.

Figure 4B:
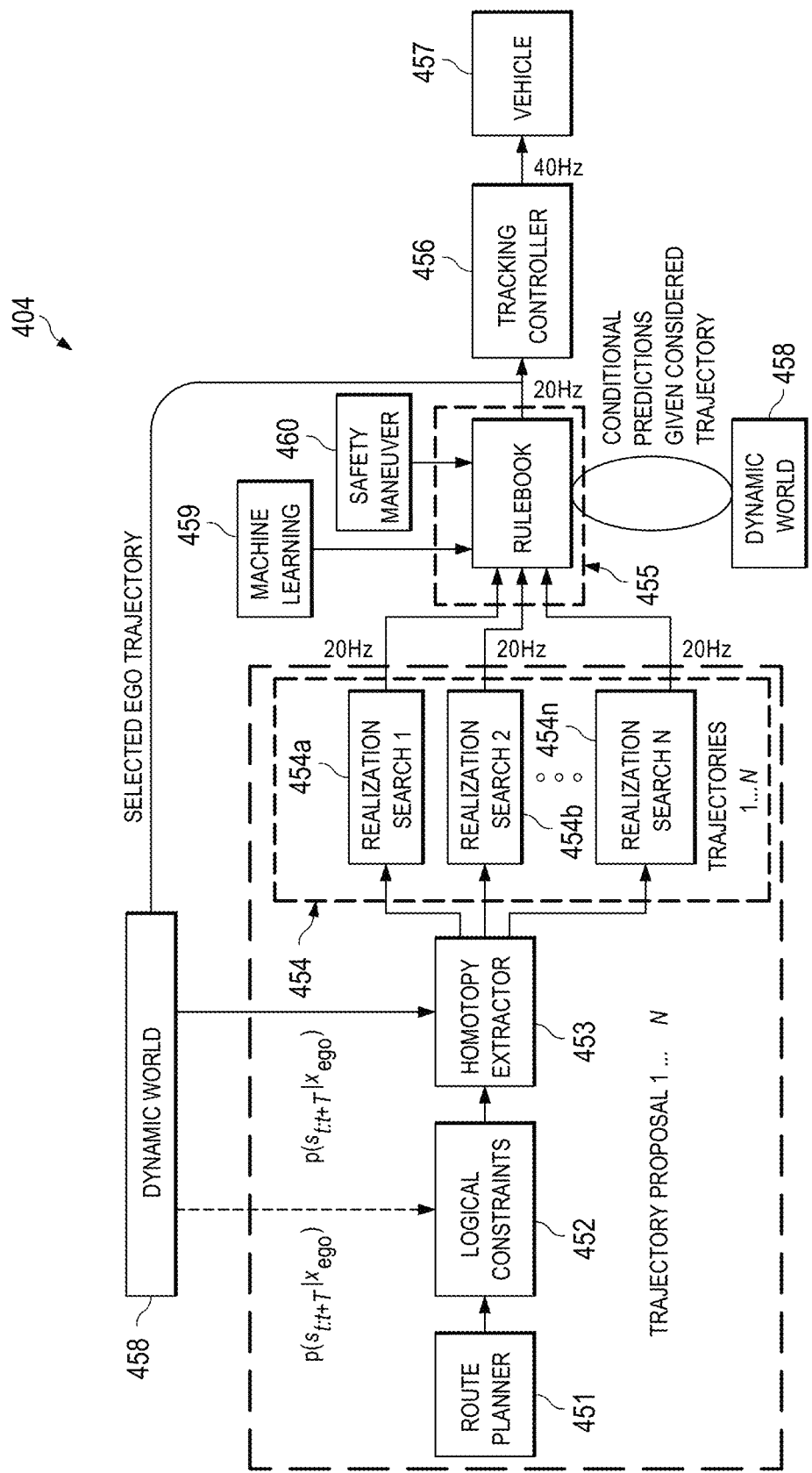
FIG. 4B is a block diagram of a planning module, in accordance with one or more embodiments.

FIG. 4B is a block diagram of the planning module 404, in accordance with one or more embodiments. The planning module 404 includes route planner 451, logical constraints 452, homotopy extractor 453, sample-based maneuver realizer 454, trajectory score generator 455, tracking controller 456 and AV 457.

In an embodiment, the route planner 451: 1) receives an initial and terminal state; 2) plans a desired sequence of roadblocks/lanes with a lane router; 3) splits the route into segments based on a lane change, such that a segment does not contain a lane change; 4) selects segments in which the AV is located based on the AV's state (from dynamic world model 458) which is projected on the road blocks; 5) extracts baseline paths for selected segments (which can be marked as baseline path "desired" in case a lane change is desired); and 6) trims baseline paths based on maximal/minimal length. In case there is no lane change required, the adjacent baseline path is extracted and labeled as a soft logical constraint, meaning the AV can use the lane if needed for collision avoidance. Soft logical constraints are illustrated and described in more detail with reference to FIG. 13.

In an embodiment, route planner 451 generates a graphical representation of the operating environment of the AV, the AV's physical state based on sensor data (e.g., speed, position), and possible outcomes. In an embodiment, the graphical representation is a directed graph or decision graph (described below) that includes a number of nodes where each node represents a sample of the AV's decision space for a particular driving scenario, such as, for example, a plurality of maneuvers related to other vehicles and objects and environmental constraints (e.g., drivable area, lane markings 1524). The lane markings 1524 are illustrated and described in more detail with reference to FIG. 15. The edges of the directed graph represent different trajectories available to the AV 100 for the particular driving scenario (see FIG. 15).

In an embodiment, logical constraints 452 include "hard" constraints and "soft" constraints. Hard constraints are logical constraints that must not be violated because, if violated, the AV would collide with another object, such as a pedestrian who may be "jaywalking" across the road. Note that hard constraints do not imply "do not collide." Rather, a hard constraint can be, for example, a combination of spatial and speed constraints that can lead to a collision. For example, a hard constraint can be expressed in words as: "if the AV proceeds at 30 mph in lane A or accelerates at 2 mph/s in lane B, it will collide with the pedestrian." Hence, the hard constraint expressed formally is "do not proceed at 30 mph in lane A" and "do not exceed 25 mph in lane A."

Soft constraints are constraints that should be followed by the AV but can be violated to, for example, complete a trip to a destination or to avoid a collision. Some examples of "soft" constraints include but are not limited to: passenger comfort constraints and a minimum threshold of lateral clearance from a pedestrian who is crossing the street (jaywalking) to provide comfort to the pedestrian and the AV passenger. In an embodiment, soft constraints are embodied in the one or more rulebook (s). Soft constraints can include spatial constraints that change over time. A spatial constraint can be a drivable area.

In an embodiment, homotopy extractor 453 generates a set of potential maneuvers for the AV. Instead of hypothesizing objectives and then choosing the objective that performs the best, homotopy extractor 453 hypothesizes active constraint sets, referred to as a "homotopy" (defined below), and then chooses the constraint sets that result in lower cost. From route planner 451, homotopy extractor 453 receives a route plan which contains the baseline path, also referred to as an "anchor path." The "anchor path" is the best estimate of the lane that the AV is located in, and a soft logical constraint (e.g., a potentially desired path) which can be used by the AV when performing a lane change. In an embodiment, the route planner 451 also contains speed squared and spatial constraints which are computed along the anchor path (e.g., computed with a bound generator).

Given an initial state of the AV, a terminal state of the AV, a map representation and predictions of other agents in the scene, the homotopy extractor 453 finds all "approximately" feasible maneuvers the AV can perform. Note that in this context the resulting maneuvers might not be dynamically feasible but the homotopy extractor 453 guarantees that the resulting constraint set describing the maneuver is not an empty set (considering also the AV footprint). An AV maneuver is described by the homotopy. As described above, a homotopy is a subset of a set of constraints on a trajectory of an AV that the AV can adhere to while traversing a particular route. When there are multiple homotopies, a subset of the multiple homotopies can be selected that include a subset of constraints. In some implementations, a homotopy can be a unique space where any path starting at a starting position (AV state) and ending at a terminal state can be continuously deformed. To find these maneuvers, the homotopy extractor 453 iterates over all possible decisions the AV can take with respect to other agents, e.g. pass on the left/right side, pass before or after or just stay behind. In short, an output of the homotopy extractor 453 describes the spatiotemporal location of the AV to an agent. Although this can be a computationally expensive search, due to a set of simple checks all infeasible combinations can be eliminated. The homotopy extractor 452 is described in further detail in application, entitled "Homotopic-Based Planner for Autonomous Vehicles," U.S. application Ser. No. 17/544,556 filed Dec. 7, 2021, which is incorporated by reference herein in its entirety.

To be able to describe constraints representing where the other agents are located, and what a collision of the AV with these agents mean, every agent is converted into a station-based and spatial-based obstacle. The station-based constraint is parameterized over time while the spatial-based constraint is parameterized over both station and time. Further detail regarding the homotopy extractor 503 is described in reference to FIGS. 13-16.

In an embodiment, the realization searches 454*a* . . . 454*n* are performed by sample-based maneuver realizer 454 to generate a set of trajectories 1 . . . N for all the extracted homotopies. The sample-based maneuver realizer 454 is described in further detail in application, entitled "Sampling-Based Maneuver Realizer," U.S. application Ser. No. 17/544,678 filed Dec. 7, 2021, which is incorporated by reference herein in its entirety.

In an embodiment, trajectory score generator 455 uses one or more rulebooks, one or more machine learning models 459 and/or one or more safety maneuver models 460 to score the trajectories 1 . . . N, and uses the scores to select the trajectory that is the most compliant with the rules in the one or more rulebooks. In an embodiment, a predefined cost function is used to generate the trajectory scores.

In embodiments that use a cost function, a total order or partial order hierarchical cost function can be used to score the trajectories. The cost function is applied to metrics (e.g., Boolean values) associated with the violation and/or satisfaction of a hierarchy of rules in one or more rulebooks based on priority or relative importance. An example hierarchy of rules based on priority is as follows (from top to bottom): collision avoidance (Boolean), blockage (Boolean), terminal state in desired lane (Boolean), lane change (Boolean) and comfort (double float). In this example, every non-zero priority rule is defined as Boolean to avoid over-optimization of high priority costs. The most important or highest priority rule is to avoid collision, followed by avoiding blockage, followed by avoiding a terminal state in a desired lane, followed by a lane change, followed by comfort rules (e.g., maximum accelerations or decelerations). These example rules are described more fully as follows:

1. Collision: Is set to TRUE if there exists a state along the scored trajectory where the AV vehicle's footprint collides with the footprint of any other agent/object (e.g., they are considered to collide if their polygons intersect).

2. Blockage: A trajectory is considered blocked if the terminal homotopy does not contain the desired goal state and the terminal velocity of the trajectory is below a specified threshold (e.g., 2 m/s).

3. Terminal State in Desired Lane: Is set to TRUE if the terminal state of a trajectory is found in a lane which is desired lane change, and is set to TRUE if the AV's footprint crosses a lane divider at any time during the trajectory.

4. Comfort: maximums for acceleration/deceleration, braking distance, lateral clearance can be considered.

For each trajectory, the rules are checked and metrics determined. A cost function is formulated using the metrics and then minimized using, for example, a least squares formulation or any other suitable solver. The trajectory with the lowest cost is the selected trajectory, i.e., the trajectory with the least rule violations or most compliant. In an embodiment the minimized cost functions can be used to score the trajectories, as described in further detail below. Note that the rules described above are merely examples. Those with ordinary skill will recognized that any suitable cost function and rulebook can be used for trajectory scoring, including rulebooks with more or fewer rules.

For machining learning embodiments, trajectory score generator 455 can implement one or more machine learning models 509 and/or safety maneuver models 510 to score trajectories. For example, a neural network can be used to predict a score of trajectory.

Tracking controller 456 is used to improve the robustness of the planning module 404 against unexpected spikes in computational demand. Tracking controller 456 is a fast-executing tracking controller that provides steady and smooth control inputs and allows the planning module 404 to react faster towards disturbances. In an embodiment, tracking controller 506 runs at 40 Hz. The input to tracking controller 456 is the selected trajectory provided by the trajectory score generator 455 that has been parameterized by time, such that tracking controller 506 can query an exact desired position of the AV at a given time.

In an embodiment, the tracking controller 456 is formulated as a type of model predictive control (MPC) problem with constraints on the control inputs and states. However, any suitable multivariable control algorithm can also be used. The MPC-type formulation uses an internal dynamic model of a process, a cost function J over a receding horizon and an optimization algorithm for minimizing the cost function J using a control input u. An example cost function for optimization is a quadratic cost function.

In an embodiment, the dynamic model is a kinematic vehicle model in Cartesian coordinates or any other suitable reference coordinate frame. For example, the kinematic vehicle model can be a bicycle model that allows a side slip angle to be defined geometrically to express yaw rate in terms of variables that are represented with respect to the center of gravity of the AV. In an embodiment, the cost function J follows a contouring error formulation (orthogonal deviation from the anchor path) where the objective is to minimize the lateral and longitudinal error.

Autonomous Vehicle Inputs

FIG. 5 is a block diagram illustrating an example of inputs 502*a-d* (e.g., sensors 121 shown in FIG. 1) and outputs 504*a-d* (e.g., sensor data) that is used by the perception module 402 (FIGS. 4A-4B), in accordance with one or more embodiments. One input 502*a* is a LiDAR (Light Detection and Ranging) system (e.g., LiDAR 123 shown in FIG. 1). LiDAR is a technology that uses light (e.g., bursts of light such as infrared light) to obtain data about physical objects in its line of sight. A LiDAR system produces LiDAR data as output 504*a*. For example, LiDAR data is collections of 3D or 2D points (also known as a point clouds) that are used to construct a representation of the environment 190.

Another input 502*b* is a RADAR system. RADAR is a technology that uses radio waves to obtain data about nearby physical objects. RADARs can obtain data about objects not within the line of sight of a LiDAR system. A RADAR system 502*b* produces RADAR data as output 504*b*. For example, RADAR data are one or more radio frequency electromagnetic signals that are used to construct a representation of the environment 190.

Another input 502*c* is a camera system. A camera system uses one or more cameras (e.g., digital cameras using a light sensor such as a charge-coupled device [CCD]) to obtain information about nearby physical objects. A camera system produces camera data as output 504*c*. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In use, the camera system may be configured to "see" objects far, e.g., up to a kilometer or more ahead of the AV. Accordingly, the camera system may have features such as sensors and lenses that are optimized for perceiving objects that are far away.

Another input 502*d* is a traffic light detection (TLD) system. A TLD system uses one or more cameras to obtain information about traffic lights, street signs, and other physical objects that provide visual operation information. A TLD system produces TLD data as output 504*d*. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual operation information as possible, so that the AV 100 has access to all relevant operation information provided by these objects. For example, the viewing angle of the TLD system may be about 120 degrees or more.

In an embodiment, outputs 504*a-d* are combined using a sensor fusion technique. Thus, either the individual outputs 504*a-d* are provided to other systems of the AV 100 (e.g., provided to a planning module 404 as shown in FIGS. 4A-4B), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In an embodiment, an early fusion technique is used. An early fusion technique is characterized by combining outputs before one or more data processing steps are applied to the combined output. In an embodiment, a late fusion technique is used. A late fusion technique is characterized by combining outputs after one or more data processing steps are applied to the individual outputs.

Figure 6:
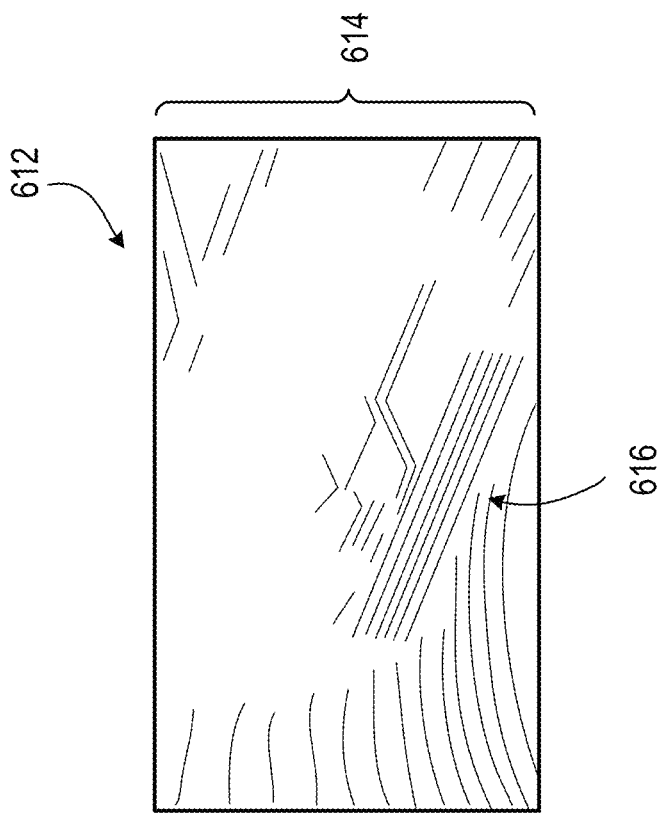
FIG. 6 is a block diagram illustrating an example of a LiDAR system, in accordance with one or more embodiments.

FIG. 6 is a block diagram illustrating an example of a LiDAR system 602 (e.g., the input 502*a* shown in FIG. 5), in accordance with one or more embodiments. The LiDAR system 602 emits light 604*a-c* from a light emitter 606 (e.g., a laser transmitter). Light emitted by a LiDAR system is typically not in the visible spectrum; for example, infrared light is often used. Some of the light 604*b* emitted encounters a physical object 608 (e.g., a vehicle) and reflects back to the LiDAR system 602. (Light emitted from a LiDAR system typically does not penetrate physical objects, e.g., physical objects in solid form.) The LiDAR system 602 also has one or more light detectors 610, which detect the reflected light. In an embodiment, one or more data processing systems associated with the LiDAR system generates an image 612 representing the field of view 614 of the LiDAR system. The image 612 includes information that represents the boundaries 616 of a physical object 608. In this way, the image 612 is used to determine the boundaries 616 of one or more physical objects near an AV.

Figure 7:
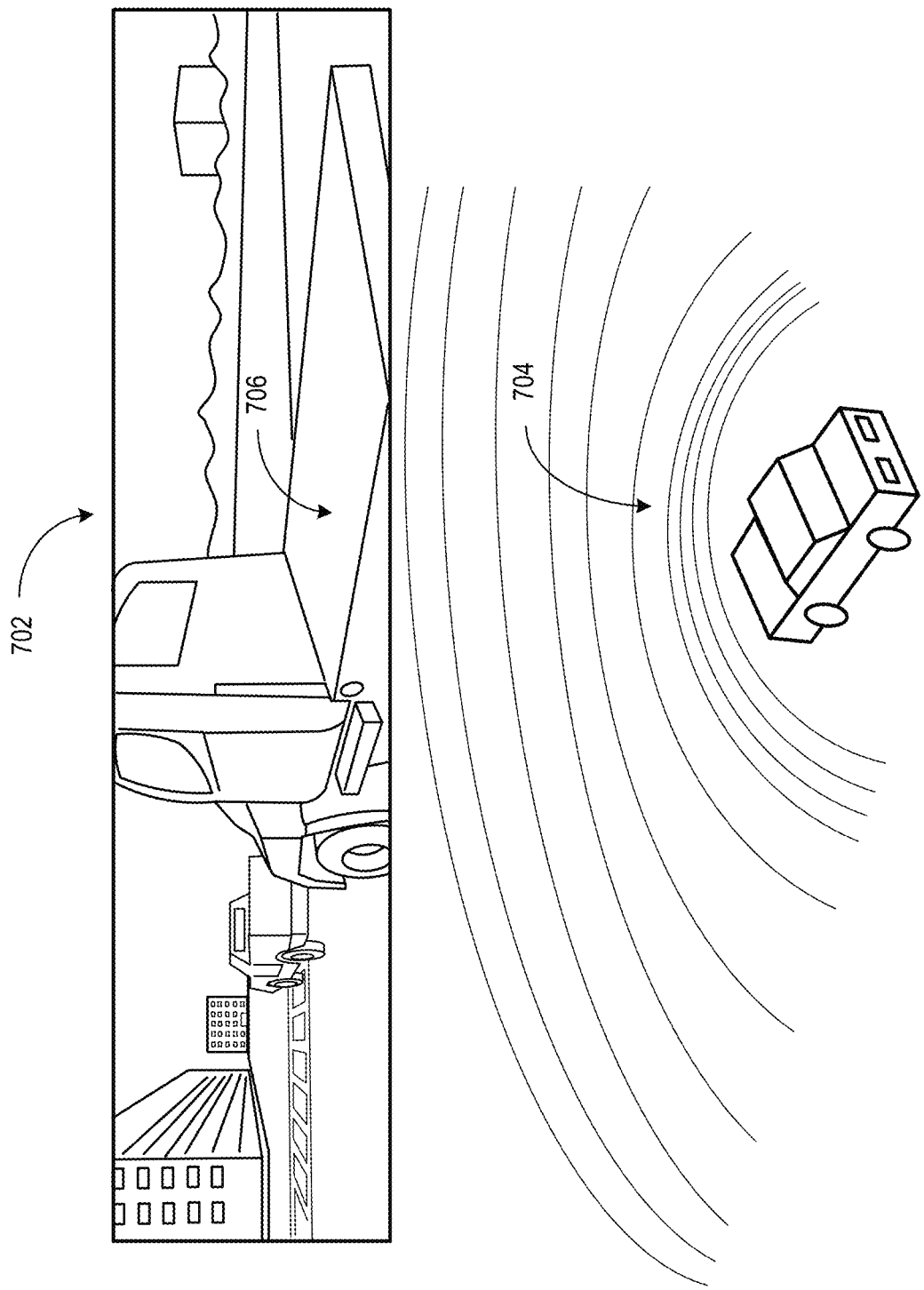
FIG. 7 is a block diagram illustrating the LiDAR system in operation, in accordance with one or more embodiments.

FIG. 7 is a block diagram illustrating the LiDAR system 602 in operation, in accordance with one or more embodiments. In the scenario shown in this figure, the AV 100 receives both camera system output 504*c* in the form of an image 702 and LiDAR system output 504*a* in the form of LiDAR data points 704. In use, the data processing systems of the AV 100 compares the image 702 to the data points 704. In particular, a physical object 706 identified in the image 702 is also identified among the data points 704. In this way, the AV 100 perceives the boundaries of the physical object based on the contour and density of the data points 704.

Figure 8:
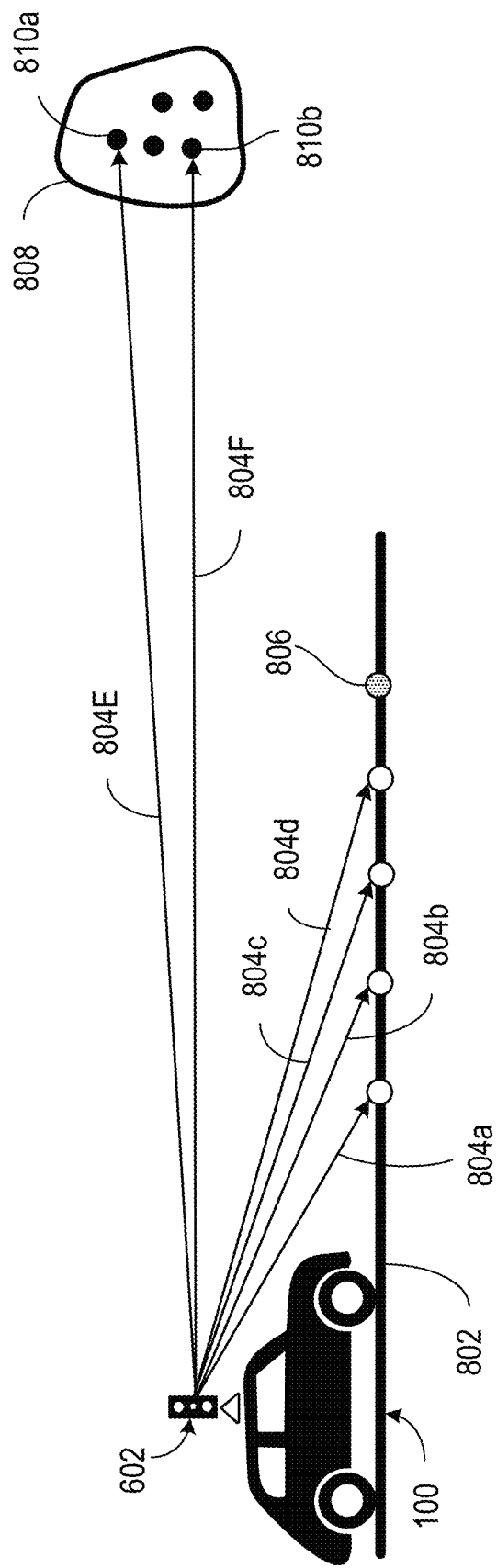
FIG. 8 is a block diagram illustrating the operation of the LiDAR system in additional detail, in accordance with one or more embodiments.

FIG. 8 is a block diagram illustrating the operation of the LiDAR system 602 in additional detail, in accordance with one or more embodiments. As described above, the AV 100 detects the boundary of a physical object based on characteristics of the data points detected by the LiDAR system 602. As shown in FIG. 8, a flat object, such as the ground 802, will reflect light 804*a-d* emitted from a LiDAR system 602 in a consistent manner. Put another way, because the LiDAR system 602 emits light using consistent spacing, the ground 802 will reflect light back to the LiDAR system 602 with the same consistent spacing. As the AV 100 travels over the ground 802, the LiDAR system 602 will continue to detect light reflected by the next valid ground point 806 if nothing is obstructing the road. However, if an object 808 obstructs the road, light 804*e-f* emitted by the LiDAR system 602 will be reflected from points 810*a-b* in a manner inconsistent with the expected consistent manner. From this information, the AV 100 can determine that the object 808 is present.

Path Planning

Figure 9:
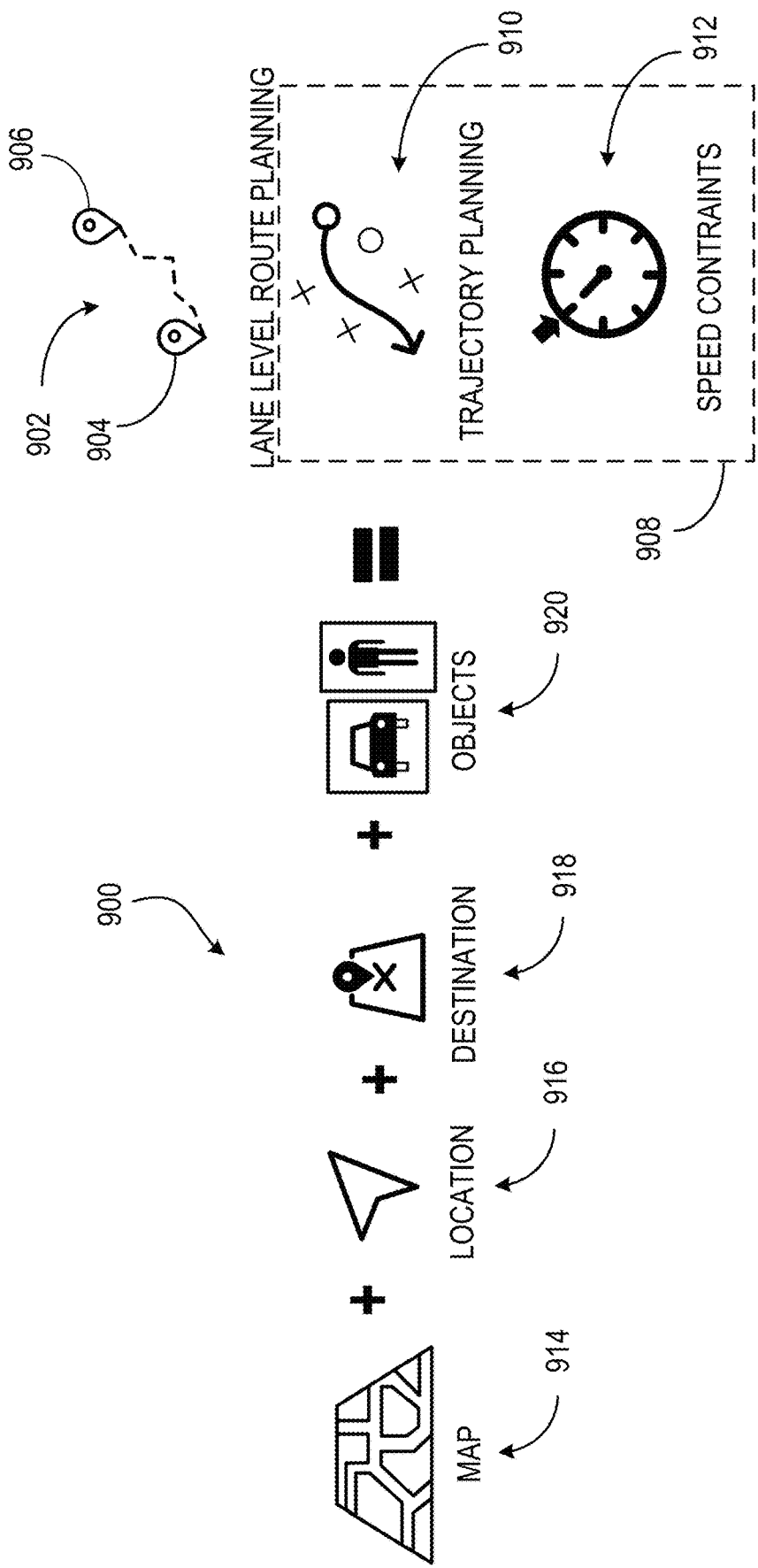
FIG. 9 is a block diagram illustrating the relationships between inputs and outputs of a planning module, in accordance with one or more embodiments.

FIG. 9 is a block diagram 900 illustrating of the relationships between inputs and outputs of a planning module 404 (e.g., as shown in FIGS. 4A-4B), in accordance with one or more embodiments. In general, the output of a planning module 404 is a route 902 from a start point 904 (e.g., source location or initial location), and an end point 906 (e.g., destination or final location). The route 902 is typically defined by one or more segments. For example, a segment is a distance to be traveled over at least a portion of a street, road, highway, driveway, or other physical area appropriate for automobile travel. In some examples, e.g., if the AV 100 is an off-road capable vehicle such as a four-wheel-drive (4WD) or all-wheel-drive (AWD) car, SUV, pick-up truck, or the like, the route 902 includes "off-road" segments such as unpaved paths or open fields.

In addition to the route 902, a planning module also outputs lane-level route planning data 908. The lane-level route planning data 908 is used to traverse segments of the route 902 based on conditions of the segment at a particular time. For example, if the route 902 includes a multi-lane highway, the lane-level route planning data 908 includes trajectory planning data 910 that the AV 100 can use to choose a lane among the multiple lanes, e.g., based on whether an exit is approaching, whether one or more of the lanes have other vehicles, or other factors that vary over the course of a few minutes or less. Similarly, in some implementations, the lane-level route planning data 908 includes speed constraints 912 specific to a segment of the route 902. For example, if the segment includes pedestrians or unexpected traffic, the speed constraints 912 may limit the AV 100 to a travel speed slower than an expected speed, e.g., a speed based on speed limit data for the segment.

In an embodiment, the inputs to the planning module 404 includes database data 914 (e.g., from the database module 410 shown in FIGS. 4A-4B), current location data 916 (e.g., the AV position 418 shown in FIGS. 4A-4B), destination data 918 (e.g., for the destination 412 shown in FIGS. 4A-4B), and object data 920 (e.g., the classified objects 416 as perceived by the perception module 402 as shown in FIGS. 4A-4B). In an embodiment, the database data 914 includes rules used in planning. Rules are specified using a formal language, e.g., using Boolean logic. In any given situation encountered by the AV 100, at least some of the rules will apply to the situation. A rule applies to a given situation if the rule has conditions that are met based on information available to the AV 100, e.g., information about the surrounding environment. Rules can have priority. For example, a rule that says, "if the road is a freeway, move to the leftmost lane" can have a lower priority than "if the exit is approaching within a mile, move to the rightmost lane."

Figure 10:
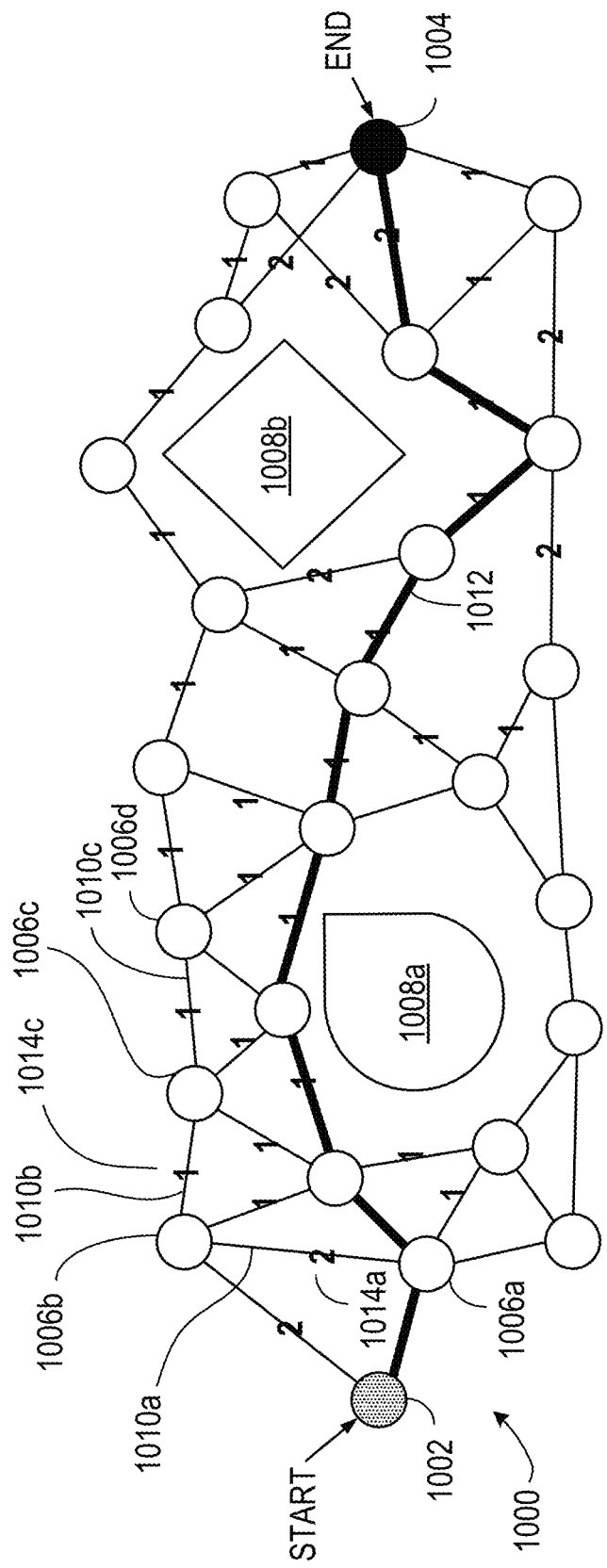
FIG. 10 illustrates a directed graph used in path planning, in accordance with one or more embodiments.

FIG. 10 illustrates a directed graph 1000 used in path planning, e.g., by the planning module 404 (FIGS. 4A-4B), in accordance with one or more embodiments. In general, a directed graph 1000 like the one shown in FIG. 10 is used to determine a path between any start point 1002 and end point 1004. In real-world terms, the distance separating the start point 1002 and end point 1004 may be relatively large (e.g., in two different metropolitan areas) or may be relatively small (e.g., two intersections abutting a city block or two lanes of a multi-lane road).

In an embodiment, the directed graph 1000 has nodes 1006*a-d* representing different locations between the start point 1002 and the end point 1004 that could be occupied by an AV 100. In some examples, e.g., when the start point 1002 and end point 1004 represent different metropolitan areas, the nodes 1006*a-d* represent segments of roads. In some examples, e.g., when the start point 1002 and the end point 1004 represent different locations on the same road, the nodes 1006*a-d* represent different positions on that road. In this way, the directed graph 1000 includes information at varying levels of granularity. In an embodiment, a directed graph having high granularity is also a subgraph of another directed graph having a larger scale. For example, a directed graph in which the start point 1002 and the end point 1004 are far away (e.g., many miles apart) has most of its information at a low granularity and is based on stored data, but also includes some high granularity information for the portion of the graph that represents physical locations in the field of view of the AV 100.

The nodes 1006*a-d* are distinct from objects 1008*a-b* which cannot overlap with a node. In an embodiment, when granularity is low, the objects 1008*a-b* represent regions that cannot be traversed by automobile, e.g., areas that have no streets or roads. When granularity is high, the objects 1008*a-b* represent physical objects in the field of view of the AV 100, e.g., other automobiles, pedestrians, or other entities with which the AV 100 cannot share physical space. In an embodiment, some or all of the objects 1008*a-b* are static objects (e.g., an object that does not change position such as a street lamp or utility pole) or dynamic objects (e.g., an object that is capable of changing position such as a pedestrian or other car).

The nodes 1006*a-d* are connected by edges 1010*a-c*. If two nodes 1006*a-b* are connected by an edge 1010*a*, it is possible for an AV 100 to travel between one node 1006*a* and the other node 1006*b*, e.g., without having to travel to an intermediate node before arriving at the other node 1006*b*. (When we refer to an AV 100 traveling between nodes, we mean that the AV 100 travels between the two physical positions represented by the respective nodes.) The edges 1010*a-c* are often bidirectional, in the sense that an AV 100 travels from a first node to a second node, or from the second node to the first node. In an embodiment, edges 1010*a-c* are unidirectional, in the sense that an AV 100 can travel from a first node to a second node, however the AV 100 cannot travel from the second node to the first node. Edges 1010*a-c* are unidirectional when they represent, for example, one-way streets, individual lanes of a street, road, or highway, or other features that can only be traversed in one direction due to legal or physical constraints.

In an embodiment, the planning module 404 uses the directed graph 1000 to identify a path 1012 made up of nodes and edges between the start point 1002 and end point 1004.

An edge 1010*a-c* has an associated cost 1014*a-b*. The cost 1014*a-b* is a value that represents the resources that will be expended if the AV 100 chooses that edge. A typical resource is time. For example, if one edge 1010*a* represents a physical distance that is twice that as another edge 1010*b*, then the associated cost 1014*a* of the first edge 1010*a* may be twice the associated cost 1014*b* of the second edge 1010*b*. Other factors that affect time include expected traffic, number of intersections, speed limit, etc. Another typical resource is fuel economy. Two edges 1010*a-b* may represent the same physical distance, but one edge 1010*a* may require more fuel than another edge 1010*b*, e.g., because of road conditions, expected weather, etc.

When the planning module 404 identifies a path 1012 between the start point 1002 and end point 1004, the planning module 404 typically chooses a path optimized for cost, e.g., the path that has the least total cost when the individual costs of the edges are added together.

Autonomous Vehicle Control

Figure 11:
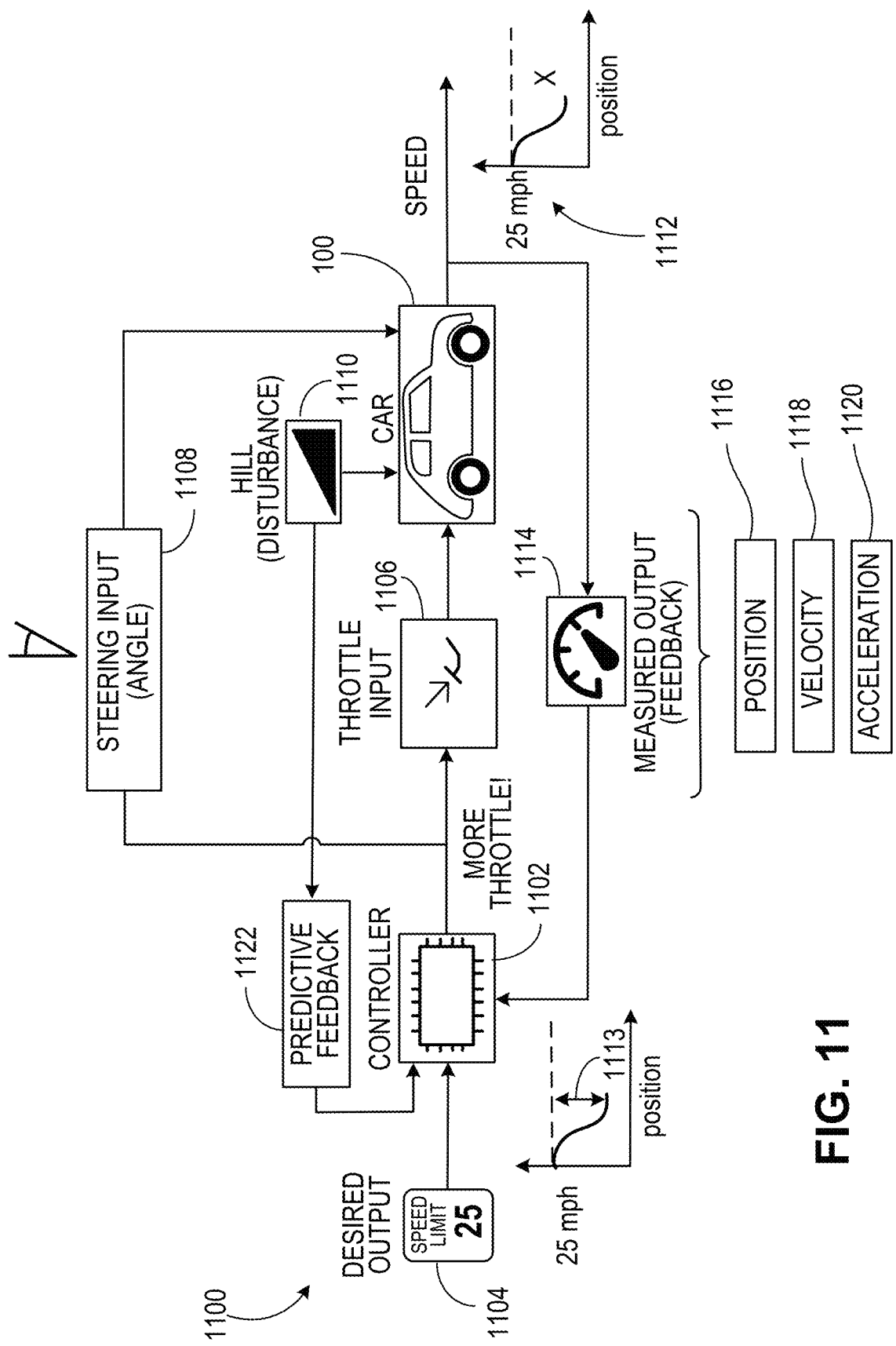
FIG. 11 is a block diagram illustrating the inputs and outputs of a control module, in accordance with one or more embodiments.

FIG. 11 is a block diagram 1100 illustrating the inputs and outputs of a control module 406 (e.g., as shown in FIGS. 4A-4B), in accordance with one or more embodiments. A control module operates in accordance with a controller 1102 which includes, for example, one or more processors (e.g., one or more computer processors such as microprocessors or microcontrollers or both) similar to processor 304, short-term and/or long-term data storage (e.g., memory random-access memory or flash memory or both) similar to main memory 306, ROM 308, and storage device 310, and instructions stored in memory that carry out operations of the controller 1102 when the instructions are executed (e.g., by the one or more processors).

In an embodiment, the controller 1102 receives data representing a desired output 1104. The desired output 1104 typically includes a velocity, e.g., a speed and a heading. The desired output 1104 can be based on, for example, data received from a planning module 404 (e.g., as shown in FIGS. 4A-4B). In accordance with the desired output 1104, the controller 1102 produces data usable as a throttle input 1106 and a steering input 1108. The throttle input 1106 represents the magnitude in which to engage the throttle (e.g., acceleration control) of an AV 100, e.g., by engaging the steering pedal, or engaging another throttle control, to achieve the desired output 1104. In some examples, the throttle input 1106 also includes data usable to engage the brake (e.g., deceleration control) of the AV 100. The steering input 1108 represents a steering angle, e.g., the angle at which the steering control (e.g., steering wheel, steering angle actuator, or other functionality for controlling steering angle) of the AV should be positioned to achieve the desired output 1104.

In an embodiment, the controller 1102 receives feedback that is used in adjusting the inputs provided to the throttle and steering. For example, if the AV 100 encounters a disturbance 1110, such as a hill, the measured speed 1112 of the AV 100 is lowered below the desired output speed. In an embodiment, any measured output 1114 is provided to the controller 1102 so that the necessary adjustments are performed, e.g., based on the differential 1113 between the measured speed and desired output. The measured output 1114 includes measured position 1116, measured velocity 1118, (including speed and heading), measured acceleration 1120, and other outputs measurable by sensors of the AV 100.

In an embodiment, information about the disturbance 1110 is detected in advance, e.g., by a sensor such as a camera or LiDAR sensor, and provided to a predictive feedback module 1122. The predictive feedback module 1122 then provides information to the controller 1102 that the controller 1102 can use to adjust accordingly. For example, if the sensors of the AV 100 detect ("see") a hill, this information can be used by the controller 1102 to prepare to engage the throttle at the appropriate time to avoid significant deceleration.

Figure 12:
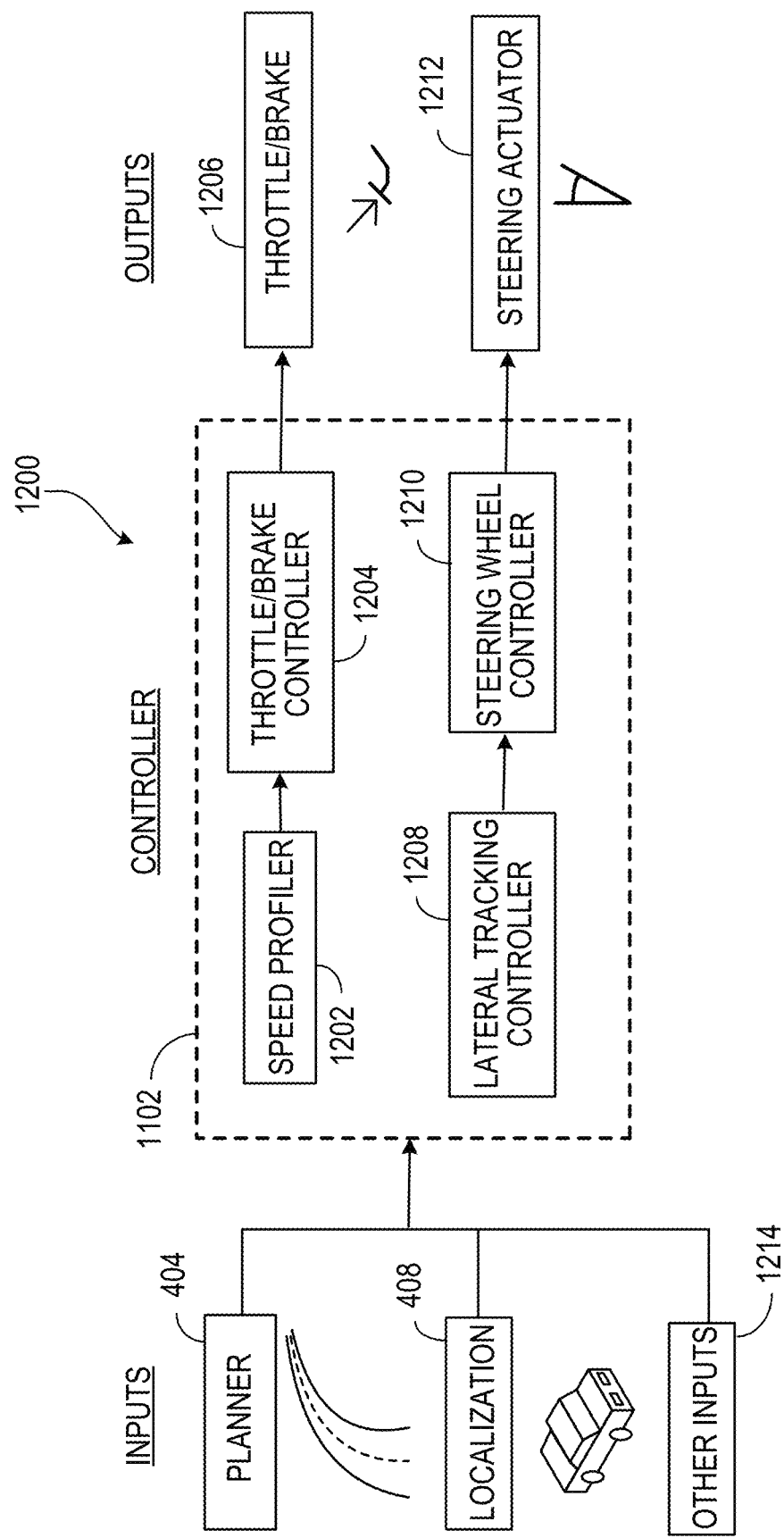
FIG. 12 is a block diagram illustrating the inputs, outputs, and components of a controller, in accordance with one or more embodiments.

FIG. 12 is a block diagram 1200 illustrating the inputs, outputs, and components of the controller 1102, in accordance with one or more embodiments. The controller 1102 has a speed profiler 1202 which affects the operation of a throttle/brake controller 1204. For example, the speed profiler 1202 instructs the throttle/brake controller 1204 to engage acceleration or engage deceleration using the throttle/brake 1206 depending on, e.g., feedback received by the controller 1102 and processed by the speed profiler 1202.

The controller 1102 also has a lateral tracking controller 1208 which affects the operation of a steering controller 1210. For example, the lateral tracking controller 1208 instructs the steering controller 1204 to adjust the position of the steering angle actuator 1212 depending on, e.g., feedback received by the controller 1102 and processed by the lateral tracking controller 1208.

The controller 1102 receives several inputs used to determine how to control the throttle/brake 1206 and steering angle actuator 1212. A planning module 404 provides information used by the controller 1102, for example, to choose a heading when the AV 100 begins operation and to determine which road segment to traverse when the AV 100 reaches an intersection. A localization module 408 provides information to the controller 1102 describing the current location of the AV 100, for example, so that the controller 1102 can determine if the AV 100 is at a location expected based on the manner in which the throttle/brake 1206 and steering angle actuator 1212 are being controlled. In an embodiment, the controller 1102 receives information from other inputs 1214, e.g., information received from databases, computer networks, etc.

Autonomous Vehicle Operation Using Maneuver Generation

Figure 13:
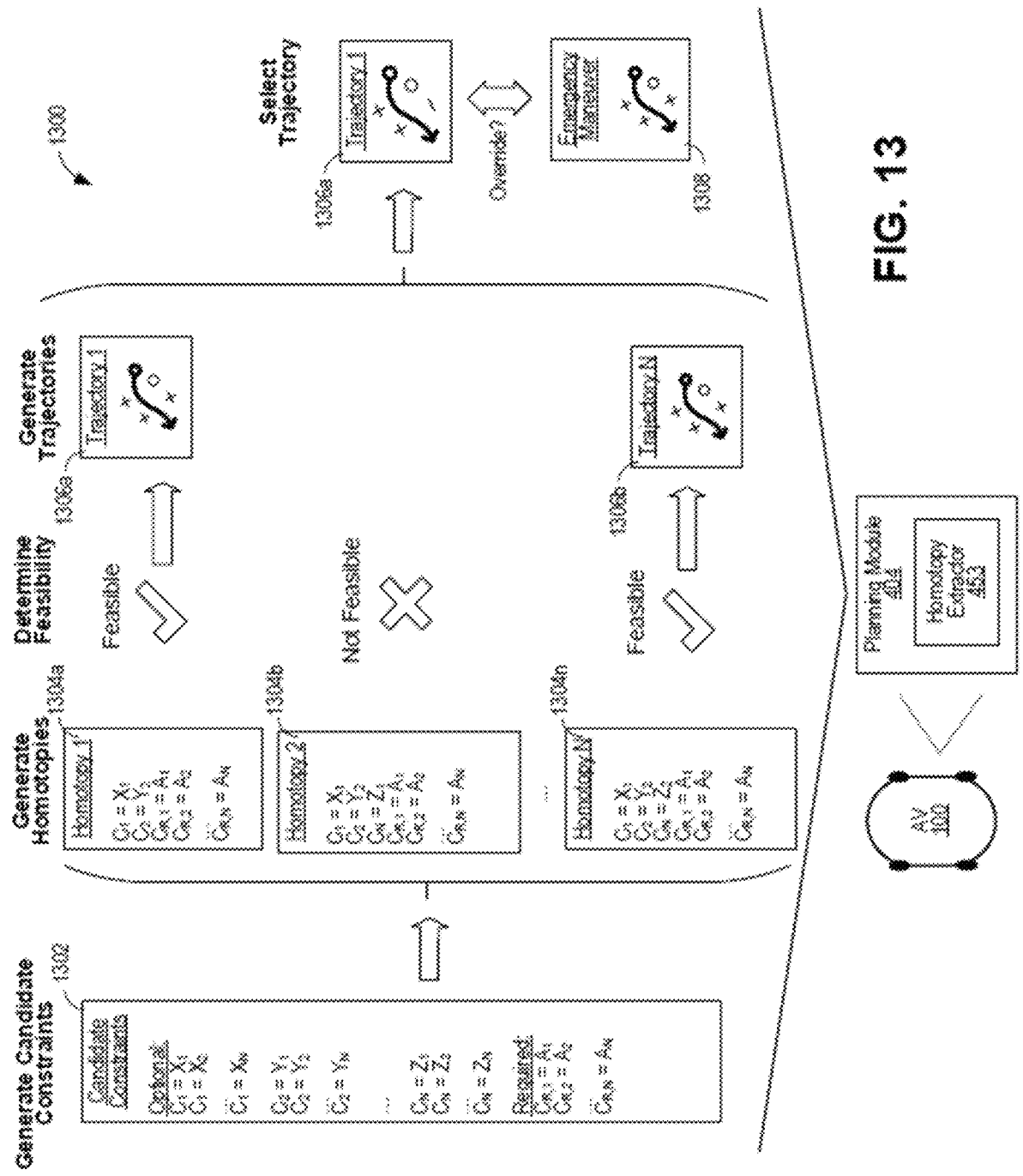
FIG. 13 is a flow diagram illustrating an example process for determining a maneuver, in accordance with one or more embodiments.

FIG. 13 is a flow diagram illustrating an example process 1300 for determining a maneuver for the AV 100, in accordance with one or more embodiments. The AV 100 is illustrated and described in more detail with reference to FIG. 1. In some implementations, the process 1300 can be performed, at least in part, using the homotopy extractor 453 of the planning module 404 of the AV 100 (e.g., as described with respect to FIGS. 4A and 4B).

The AV 100 uses at least one processor 146 of the AV 100 to generate multiple, initial trajectories for the AV 100 based on a road segment (e.g., the road segment 1500 can include lanes 1512, 1516). The processor 146 is illustrated and described in more detail with reference to FIG. 1. The road segment 1500 and lanes 1512, 1516 are illustrated and described in more detail with reference to FIG. 15. The process for trajectory generation is illustrated and described in more detail with reference to FIG. 10. The AV 100 receives sensor data (e.g., LiDAR output data 504a) from at least one sensor 121 of the AV 100. The sensor 121 is illustrated and described in more detail with reference to FIG. 10. The LiDAR output data 504a is illustrated and described in more detail with reference to FIG. 5. The AV 100's use of sensor data is also described in more detail with reference to FIG. 4B. The AV 100 is traveling the road segment 1500 in lane 1516 in accordance with a trajectory 198 belonging to the multiple, initial trajectories. The trajectory 198 is further illustrated and described with reference to FIG. 1. The AV 100 predicts a potential collision between the AV 100 and an object (e.g., object 416) moving on the lane 1516 based on the sensor data 504a and the trajectory 198. The object 416 is illustrated and described in more detail with reference to FIGS. 4 and 15.

The AV 100 determines a set of constraints 1302 for the AV 100 to avoid the potential collision. The set of constraints is determined based on the sensor data 504a. For example, as shown in FIG. 13, the homotopy extractor 453 can generate a set of constraints 1302 associated with the AV 100 traversing the road segment 1500. In some implementations, each constraint of the set of constraints 1302 can include a particular parameter and a corresponding parameter value. For example, one constraint denotes that a particular parameter C_1 should be equal to a particular parameter value X_1. As another example, another constraint denotes that the same parameter C_1 should equal a different parameter value X_2. As another example, another constraint can denote that a different parameter C_2 equal a parameter value Y_1.

In an embodiment, the set of constraints includes hard logical constraints and soft logical constraints. Hard logical constraints are those that that the AV 100 must obey, for example, to avoid a potential collision or to reach the destination 199. The destination 199 is illustrated and described in more detail with reference to FIG. 1. Hard logical constraints are described in more detail with reference to FIG. 4B. A constraint can thus be required or "hard" (e.g., the AV 100 must adhere to hard constraints while traversing to the destination 199). For example, hard logical constraints can pertain to a predicted safety of one or more passengers of the AV 100 and/or the safety of the AV 100. A constraint can specify that the AV 100 not make contact with certain objects (e.g., other vehicles 193, pedestrians 192, or obstacles), remain within the boundaries 1528, 1532 of a road segment 1500, travel in a direction of traffic of a road, not accelerate or decelerate in a manner that would injury its passengers, etc. The vehicle 193 and pedestrian 192 are illustrated and described in more detail with reference to FIG. 1. The boundaries 1528, 1532 and road segment 1500 are illustrated and described in more detail with reference to FIG. 15. As another example, a constraint can specify that a likelihood of the AV 100 colliding with the object 416, a vehicle 193, a pedestrian 192, or other object be less than a threshold value. The object 416 is illustrated and described in more detail with reference to FIGS. 4A, 15. In some implementations, the likelihood is calculated by the homotopy extractor 453 using one or more computer simulations or dynamic models.

Soft logical constraints are those that the AV 100 should obey but can violate, for example, to avoid a potential collision. Soft logical constraints are described in more detail with reference to FIG. 4B. For example, at least some of the set of constraints 1302 can be soft logical constraints (e.g., the AV 100 should try to but does not necessarily need to adhere to soft logical constraints while traversing to the destination 199). Soft logical constraints can pertain to a predicted comfort of one or more passengers of the AV. For instance, a constraint can specify that the AV 100 adhere to certain acceleration limitations, braking limitations, speed limitations, turning rate limitations, etc. based on the effect these constraints have on the comfort of a passenger of the AV.

The set of constraints 1302 can represent any aspect that may restrict, control, or otherwise influence the operation of the AV 100 as it traverses to the destination. As an example, at least some of the set of constraints 1302 can pertain to the performance capabilities of the AV 100. For instance, a constraint can specify that the AV 100 is to adhere to certain map constraints based on the performance capabilities of the AV, including but not limited to: acceleration limitations, braking limitations, speed limitations, turning rate limitations, inertial limitations, etc. As another example, a constraint can specify a range of motion of the AV 100 (e.g., the AV 100 can travel forward or backward, while remaining straight or turning, but cannot travel side to side).

Figure 15:
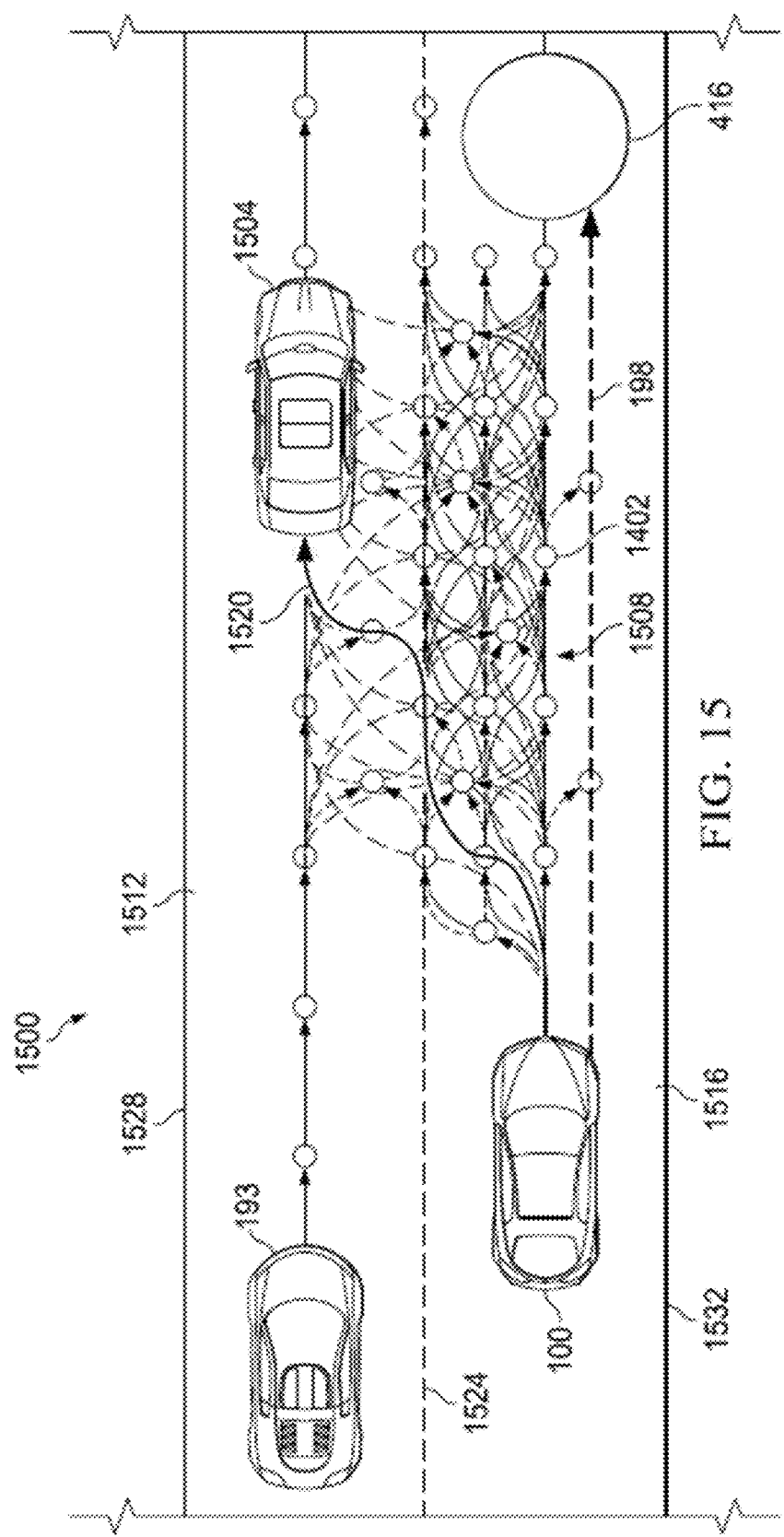
FIG. 15 is a block diagram illustrating an example maneuver, in accordance with one or more embodiments.

In an embodiment, the set of constraints 1302 includes environmental constraints indicating at least one of a drivable area of the road segment 1500 or lane markings 1524 of the road segment 1500. The drivable area and lane markings 1524 of the road segment 1500 are illustrated in FIG. 15. For example, at least some of the set of constraints 1302 can be map constraints that pertain to the map geometry of one or more roads that that AV 100 can use to traverse to the destination. For instance, a constraint can specify that the AV 100 is to be confined to certain lanes of a road and/or within certain boundaries 1528, 1532 of a road segment 1500 (e.g., between the left and right edges of a navigable portion of a road). As another example, a constraint can specify that presence and location of obstacles (e.g., the object 416) on a road, through which an AV 100 cannot pass.

In an embodiments, at least some of the set of constraints 1302 can pertain to legal constraints regarding an operation of the AV 100. For instance, a constraint can specify that the AV 100 is to adhere to a particular speed limit of a road and/or a particular flow of traffic of a road (e.g., a direction of travel). As another example, a constraint can specify that the AV 100 is to adhere to traffic rules or laws in a particular jurisdiction. Although example constraints 1302 are described herein, these are merely illustrative examples. In practice, the set of constraints 1302 can include additional constraints, either instead of or in addition to those described herein.

In an embodiment, the AV 100 determines multiple homotopies 1304a-1304n. Each homotopy of the multiple homotopies 1304a-1304n includes a different respective combination of the set of constraints 1302. The homotopy extractor 453 generates one or more homotopies 1304a-1304n based on the set of constraints 1302. For example, each homotopy can include a different one of the set of constraints 1302 and/or a different combination of two or more of the set of constraints 1302. Determining a maneuver for the AV 100 is based on at least some of the multiple homotopies 1304a-1304n.

In some implementations, each homotopy includes one or more of the soft logical constraints. Further, each homotopy can include each of the hard logical constraints. In practice, whether a particular constraint is a soft or a hard logical constraint can vary, depending on the implementation. As an example, in some implementations, constraints pertaining to the performance capabilities of the AV 100, the map (environmental) constraints of one or more roads that that AV 100 can use to traverse to the destination 199, the legal constraints regarding an operation of the AV 100, and/or the safety of one or more passengers of the AV may be considered "required." As another example, in some implementations, constraints pertaining to comfort of one or more passengers of the AV 100 and/or constraints specifying that the AV 100 perform certain operations or tasks may be considered soft logical constraints.

In the example shown in FIG. 13, a first homotopy 1304a ("Homotopy 1") includes (i) the soft logical constraint that a parameter C_1 be equal to a parameter value X_1, (ii) the soft logical constraint that a parameter C_2 be equal to a parameter value Y_2, and (iii) each of the hard logical constraints. Further, a second homotopy 1304b ("Homotopy 2") includes (i) the soft logical constraint that the parameter C_1 be equal to the parameter value X_1 (as in the Homotopy 1), (ii) the soft logical constraint that the parameter C_2 be equal to the parameter value Y_2 (as in the Homotopy 1), (iii) an additional soft logical constraint that a parameter C N be equal to a parameter value Z_1, and (iv) each of the hard logical constraints (as in the Homotopy 1). That is, although the Homotopy 2 shares some of the same constraints as in the Homotopy 2, it includes an additional constraint that is not in the Homotopy 1.

Further, a third homotopy 1304n ("Homotopy N") includes (i) the soft logical constraint that the parameter C_1 be equal to the parameter value X_1 (as in the Homotopies 1 and 2), (ii) the soft logical constraint that the parameter C_2 be equal to the parameter value Y_2 (as in the Homotopies 1 and 2), (iii) the soft logical constraint that a parameter C N be equal to a parameter value Z_2, and (iv) each of the hard logical constraints (as in the Homotopies 1 and 2). That is, although the Homotopy 3 shares some of the constraints as in the Homotopies 1 and 2, it specifies a different parameter value for one of its constraints.

Although three example homotopies are shown in FIG. 13, this is merely an illustrative example. In practice, the homotopy extractor 453 can generate any number of homotopies, each having a different respective subset of the set of constraints 1302. The homotopy extractor 453 determines whether each of the homotopies 1304a-1304n is "feasible." As an example, for each homotopy, the homotopy extractor 453 can determine whether the AV can traverse to the destination 199 in accordance with the constraints of that homotopy, without colliding with other objects (e.g., the object 416) on the road segment 1500, without negatively impacting the safety of its passengers, without violating traffic rules or laws of the jurisdictions, etc.

In an embodiment, the AV 100 predicts a motion of the AV 100 on the road segment 1500 according to a degree of precision. The AV 100 determines that the AV 100 can traverse the road segment 1500 in accordance with a subset of the multiple homotopies (a particular combination of constraints) based on the predicted motion. Determining the maneuver is further based on the subset of the multiple homotopies. For example, the homotopy extractor 453 can determine whether each of the homotopies 1304a-1304n is feasible by predicting the motion of the AV 100. For each homotopy, the homotopy extractor 453 performs a simulation of the AV motion using computer simulation or a dynamic model to predict how the AV 100 will move as it traverses the road segment 1500, while attempting to adhere to each of the constraints of that homotopy. If the homotopy extractor 453 determines that the AV 100 is unable to traverse the road segment 1500 while adhering to each of the constraints of that homotopy, the homotopy extractor 453 determines that the homotopy is "not feasible." If the homotopy extractor 453 determines that the AV 100 is able to traverse the road segment 1500 while adhering to each of the constraints of that homotopy, the homotopy extractor 453 determines that the homotopy (and associated maneuver) is "feasible."

In an embodiment, the AV 100 determines that the AV 100 can traverse the road segment 1500 in accordance with a subset of the multiple homotopies based on the predicted motion. Determining the maneuver is further based on the subset of the multiple homotopies. As an example, a homotopy can include a subset of constraints (subset of the multiple homotopies) specifying that: (i) the AV 100 perform certain operations and tasks at certain times and locations; (ii) the AV 100 adhere to all traffic rules and laws in the jurisdiction; (iii) the AV 100 perform in a manner that does not exceed its performance capabilities; and (iv) the AV 100 does not collide with any objects (e.g., the vehicle 193) or obstacles (e.g., the object 416) on the road. The homotopy extractor 453 can simulate the motion of the AV 100 in accordance with these constraints.

If the homotopy extractor 453 determines that the AV 100 cannot perform the specified operations and tasks unless it violates certain traffic rules or laws, the homotopy extractor 453 determines that the homotopy is "not feasible." Similarly, if the homotopy extractor 453 determines that the AV 100 cannot perform the specified operations and tasks without colliding with another object, the homotopy extractor 453 also determines that the homotopy is "not feasible." Similarly, if the homotopy extractor 453 determines that performing the specified operations and tasks would require exceeding the performance capabilities of the AV 100, the homotopy extractor 453 also determines that the homotopy is "not feasible." However, if the homotopy extractor 453 determines that the AV 100 can perform the specified operations and tasks, and without violating any of the other constraints, the homotopy extractor 453 determines that the homotopy is "feasible." For instance, in the example shown in FIG. 13, the homotopy extractor 453 determines that the Homotopies 1 and N are "feasible," and that the Homotopy 2 is "not feasible" (e.g., due to violation of one or more of the set of constraints 1302 specified by the Homotopy 2).

In an embodiment, the AV 100 predicts a motion of the AV 100 on the road segment 1500 according to a first degree of precision. The homotopy extractor 453 can determine whether each of the homotopies 1304a-1304n is "feasible" according to the first degree of precision. For example, the homotopy extractor 453 generates one or more trajectories (to determine a maneuver) for each of the homotopies that are determined to be "feasible," and refrains from generating trajectories for each of the homotopies that are determined to be "not feasible." For example, for each homotopy that is determined to be "feasible," the homotopy extractor 453 use a computer simulation and one or more dynamic models, control laws and equations of motion of the AV 100 to generate a trajectory (e.g., trajectory 1520) for the AV 100 that enable it to traverse the road segment 1500 using lane 1512, while adhering to each of the constraints of that homotopy. In some implementations, a simulation and/or a dynamic model can be implemented using one or more equations and/or control laws specifying a motion of one or more objects (e.g., vehicle 193 or object 416) in the environment 190. Example techniques for generating one or more trajectories for an AV 100 are described herein (e.g., with respect to FIGS. 4A, 4B, 9, and 10). The environment 190 is illustrated and described in more detail with reference to FIG. 1.

For instance, in the example shown in FIG. 13, the homotopy extractor 453 generates one or more trajectories 1306a (to determine a maneuver) corresponding to the Homotopy 1, and one or more trajectories 1306b corresponding to the Homotopy N (both of which were determined to be "feasible"). However, the homotopy extractor 453 refrains from generating any trajectories corresponding to the Homotopy 2 (which was determined to be "not feasible").

In some implementations, the homotopy extractor 453 can generate one or more trajectories for each of the homotopies that are determined to be "feasible" according to a second degree of precision. The second degree of precision can be higher than the first degree of precision. For example, the degree of precision with which the motion of the AV 100 is predicted and/or the trajectory 1520 for the AV 100 is generated can refer to (i) the spatial resolution with which the motion of the AV 100 is predicted and/or the trajectory 1520 for the AV 100 is generated, or (ii) the temporal resolution with which the motion of the AV 100 is predicted and/or the trajectory 1520 for the AV 100 is generated. The trajectory 1520 is illustrated and described in more detail with reference to FIG. 15.

The degree of precision with which the motion of the AV 100 is predicted and/or the trajectory 1520 for the AV 100 is generated can refer to (iii) the complexity of the computer simulations or dynamic models that are used to predict the motion of the AV 100 and/or generate the trajectory 1520 for the AV 100, or (iv) the amount of computation resources allotted to predicting the motion of the AV 100 and/or generating the trajectory 1520 for the AV 100. In an embodiment, the degree of precision with which the motion of the AV 100 is predicted and/or the trajectory 1520 for the AV 100 is generated can refer to (v) the tolerance or error range associated with predicting the motion of the AV 100 and/or generating the trajectory 1520 for the AV 100, and/or other such characteristics that can influence how the motion of the AV 100 can predicted and/or the trajectory 1520 for the AV 100 can be generated.

In an embodiment, the homotopy extractor 453 can initially generate predictions for each of the homotopies according to a first spatial and/or temporal resolution, and subsequently generate one or more trajectories (to determine a maneuver) for each of the homotopies that are determined to be "feasible" according to a higher second spatial and/or temporal resolution. The homotopy extractor 453 can initially predict, for each of the homotopies, a motion of the AV 100 according to a lower spatial resolution (e.g., in 10 feet increments), and subsequently generate one or more trajectories for each of the homotopies that are determined to be "feasible" according to a higher spatial resolution (e.g., 1 foot increments). The homotopy extractor 453 can initially predict, for each of the homotopies, a motion of the AV 100 according to a lower temporal resolution (e.g., in 10 second increments), and subsequently generate one or more trajectories for each of the homotopies that are determined to be "feasible" according to a higher spatial resolution (e.g., 1 second increments). Although example spatial and/or temporal resolutions are described above, these are merely illustrative examples. In practice, other spatial and/or temporal resolutions can be used to predict a motion of the AV 100 and/or generate one or more trajectories for an AV.

In an embodiment, the homotopy extractor 453 can initially generate predictions for each of the homotopies according to a first computer simulation or first dynamic model), and subsequently generate one or more trajectories for each of the homotopies that are determined to be "feasible" according to a second computer simulation or second dynamic model that is more complex than the first computer simulation or the first dynamic model (e.g., more variables and/or parameters are modeled). For instance, the first computer simulation or dynamic model can require fewer computational resources to generate a prediction (but can be less precise), whereas the first computer simulation or dynamic model may require more computation resources to generate a trajectory (but can be more precise). As another example, the first computer simulation or dynamic model can require fewer data inputs and/or less comprehensive data inputs to generate a prediction (but can be less precise), whereas the first computer simulation or dynamic model can require more data inputs and/or more comprehensive data inputs to generate a trajectory (but can be more precise). Example data inputs can include, for example, sensor data 504a, traffic data, weather data, and/or other data that regarding the characteristics of an environment of the AV 100.

In an embodiment, the AV 100 determines a maneuver by superimposing each constraint of the set of constraints 1302 on each other constraint of the set of constraints 1302. The maneuver includes a trajectory (e.g., trajectory 1520) independent of the multiple, initial trajectories (e.g., trajectory 198) that were generated for the AV 100 based on the road segment 1500 using the process for trajectory generation illustrated and described in more detail with reference to FIG. 10. The homotopy extractor 453 selects one of the generated trajectories 1306a and 1306b for the maneuver (as illustrated and described with reference to FIG. 13), and instructs the control circuit 406 of the AV 100 to execute the selected trajectory (e.g., trajectory 1306a). For instance, in the example shown in FIG. 13, the homotopy extractor 453 has selected the trajectory 1306a ("Trajectory 1") over the trajectory 1306b ("Trajectory N"). In some implementations, a trajectory 1520 can be selected using other modules, either instead of or in conjunction with the homotopy extractor 453. For example, a trajectory can be selected using the homotopy extractor 453, the realization sample-based maneuver realizer 454, and/or the trajectory score generator 455 (e.g., as described in reference to FIG. 4B).

In an embodiment, superimposing each constraint of the set of constraints 1302 on each other constraint of the set of constraints 1302 includes sampling, by the at least one processor 146, each constraint of the set of constraints 1302 with respect to time in accordance with changes in the sensor data 504a to provide the maneuver. For example, determining the set of constraints 1302 can be performed at a first frequency and determining the maneuver to generate the trajectory 1520 can be performed at a second frequency higher than the first frequency. The different constraints can thus be sampled differently. For example, the homotopy extractor 453 can operate at 10 Hz and the realization searches can be performed twice as fast at 20 Hz.

In an embodiment, determining the maneuver to generate the trajectory 1520 includes assigning, by the at least one processor 146, a respective quality metric to each homotopy of the multiple homotopies. The trajectory 1520 is selected based on the respective quality metric. For example, the trajectory 1520 can be selected by calculating a quality score or other metric for each of the trajectories generated (by the methods illustrated and described with reference to FIG. 13), and selecting the trajectory 1520 based on the quality scores or metrics.

In an embodiment, the respective quality metric is determined based on at least one of a predicted time for traversing the road segment 1500 in accordance with each homotopy, a predicted safety of a passenger of the AV 100 while traversing the road segment 1500 in accordance with each homotopy, or a predicted comfort of the passenger while traversing the road segment 1500 in accordance with each homotopy. For each trajectory (obtained from a homotopy), a quality score or metric based on various factors, such as the predicted safety or the passengers of the AV 100, the predicted comfort of the passengers of the AV 100, the predicted resources that would consumed by the AV 100 (e.g., fuel, battery charge, etc.), the predicted amount of time that it would take to transverse to the destination 199, and/or other factors can be determined.

The trajectory 1520 can be selected based on the quality scores or metrics (e.g., the trajectory having the highest quality score or metric). As described above, this selection process can be performed by one or more modules of the AV 100, such as the homotopy extractor 453, the realization sample-based maneuver realizer 454, and/or the trajectory score generator 455.

In an embodiment, the AV 100 determines a maneuver by superimposing each constraint of the set of constraints 1320 on each other constraint of the set of constraints 1320. The maneuver includes the trajectory 1520 that is independent of the multiple trajectories (e.g., trajectory 198). The AV 100 transmits instructions to the control circuit 406 of the AV 100 to override the trajectory 198. The instructions further cause the AV 100 to traverse the road segment 1500 according to the trajectory 1520 to perform the maneuver. For example, the homotopy extractor 453 determines one or more maneuvers 1308 that can override the trajectory 198 based on the homotopies 1304a-1304n. A maneuver can correspond to an evasive action (e.g., a sudden turn, braking, acceleration, lane change, etc.) to avoid an unsafe or otherwise undesirable outcome (e.g., a collision with the object 416, running off the road, etc.). In some implementations, the homotopy extractor 453 can plan the maneuver independently from the trajectory 198 and selectively override the execution of the trajectory 198 with the maneuver based on one or more data inputs. Example data inputs can include, for instance, sensor data 504a indicating that action may be warranted, commands from a passenger of the AV 100 indicating that an action is to be performed, commands from a user that is remotely monitoring or controlling the AV 100 indicating that an action is to be performed, automated commands from a remote computer system indicating that an action is to be performed, etc.

Figure 14:
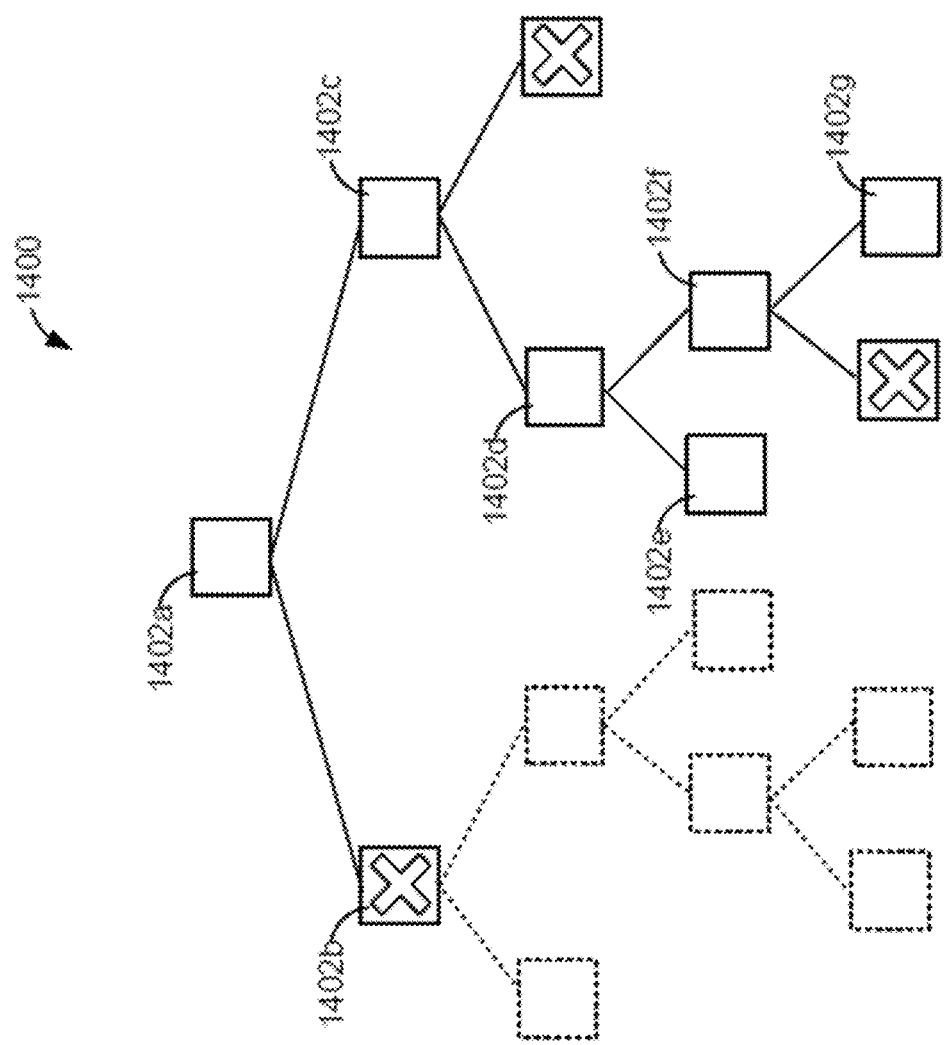
FIG. 14 illustrates an example decision graph, in accordance with one or more embodiments.

FIG. 14 illustrates an example decision graph 1400 for the AV 100, in accordance with one or more embodiments. The AV 100 is illustrated and described in more detail with reference to FIG. 1. In some implementations, the homotopy extractor 453 determines whether certain homotopies are "feasible" or "not feasible" based on the decision graph 1400. The homotopy extractor 453 is illustrated and described in more detail with reference to FIG. 4B. As an illustrative example, the simplified decision graph 1400 is shown in FIG. 14.

In an embodiment, determining that the AV 100 can traverse the road segment 1500 in accordance with a subset of the multiple homotopies (e.g., by performing a maneuver) includes generating, by the at least one processor 146, the decision graph 1400 based on the subset of the multiple homotopies. The road segment 1500 illustrated and described in more detail with reference to FIG. 1. The processor 146 is illustrated and described in more detail with reference to FIG. 1. The decision graph 1400 is illustrated and described in more detail with reference to FIG. 14. The subset of the multiple homotopies is described in more detail with reference to FIG. 13. The decision graph 1400 includes multiple nodes 1402. Each node corresponds to a different maneuver.

In an embodiment, the decision graph 1400 includes several interconnected nodes 1402, each corresponding to a different respective subset of the set of constraints 1302. The nodes can be arranged hierarchically (e.g., according to different tiers of levels) and according to one or more branches, where a "child" node inherits the constraints associated with its "parent" node and additionally includes one or more additional constraints. In some implementations, the decision graph 1400 can be similar to the directed graph 1000 shown in FIG. 10. The homotopy extractor 453 can determine the feasibility of the AV 100 traversing to the destination 199 according to the constraints associated with each node, beginning from the node having the highest level or tier, and progressing through the nodes of successively lower and levels or tiers. The destination 199 is illustrated and described in more detail with reference to FIG. 1. If the homotopy extractor 453 determines that it is not feasible to adhere to the constraints associated with a particular node, the homotopy extractor 453 can refrain from assessing the feasibility of that node's child nodes.

For example, referring to FIG. 14, the homotopy extractor 453 determines that it is feasible to traverse to the destination 199 according to the constraints associated with the highest level node 1402a. Based on this determination, the homotopy extractor 453 subsequently assesses the feasibility each of the child nodes 1402b and 1402c, and determines that it is not feasible to traverse to the destination 199 according to the constraints associated with the node 1402*b*, but that it is feasible to traverse to the destination 199 according to the constraints associated with the node 1402*c*. Based on this determination, the homotopy extractor 453 refrains from assessing the feasibility of any of the nodes that are dependent from the node 1402*b*, and continues assessing the feasibility of the nodes that are dependent from the node 1402*c*. The process described above can continue until each of the nodes in the decision graph 1400 have been assessed or omitted from assessment (due to a "not feasible" parent node).

In some implementations, the homotopy extractor 453 can generate one or more candidate trajectories (to determine a maneuver) based on the nodes that were determined to be "feasible." For example, referring to FIG. 14, the homotopy extractor 453 can generate one or more candidate trajectories for each of the nodes 1402*a*, 1402*d*, 1402*e*, 1402*f*, and/or 1402*g*. In some implementations, the homotopy extractor 453 can generate one or more candidate trajectories based on the nodes that were determined to be "feasible" and that also do not have any child nodes. For example, referring to FIG. 14, the homotopy extractor 453 can generate one or more candidate trajectories for each of the nodes 1402*e* and 1402*g*. As described above, the homotopy extractor 453 can determine a feasibility for each of the nodes according to a first degree of precision, and generate candidate trajectories according to second higher degree of precision.

FIG. 15 is a block diagram illustrating an example maneuver for the AV 100, in accordance with one or more embodiments. The AV 100 is illustrated and described in more detail with reference to FIG. 1. In an embodiment, at least some of the set of constraints 1302 specify that the AV 100 perform certain operations or tasks. The set of constraints 1302 is illustrated and described in more detail with reference to FIG. 13. For instance, a constraint can specify that an AV 100 perform a particular maneuver. In an embodiment, performing the maneuver includes operating the AV 100 to a particular location relative to the object 416 to avoid a potential collision. For example, a constraint can specify that the AV 100 change lanes on a road at a particular time and location. As another example, a constraint can specify that the AV 100 remain in its current location at a particular time and location.

In an embodiment, the set of constraints 1302 includes station-based constraints that are parameterized, by the at least one processor 146, over time using the sensor data 504*a*. The object 416 and the vehicles 193, 1504 are sometimes referred to as "agents." To be able to describe constraints representing where the agents are located, and what a collision of the AV 100 with these agents represents, each agent is converted into a station-based and spatial-based obstacle. A station-based constraint is parameterized over time. Further detail regarding the homotopy extractor 503, and its extraction and grouping of constraints is described in reference to FIGS. 13-14. The set of constraints 1302 also includes spatial-based constraints that are parameterized, by the at least one processor 146, over station and time using the sensor data 504*a*. The parameterization of the constraints is performed by sampling, described in more detail with reference to FIG. 13.

In an embodiment, determining the maneuver includes generating, by the at least one processor 146, a union of the station-based constraints and the spatial-based constraints to provide the maneuver. For example, the union of the station-based constraints and the spatial-based constraints is an operation using which the station-based constraints and the spatial-based constraints are combined and related to each other. In an embodiment, each of the station-based constraints and the spatial-based constraints are stored and manipulated as matrices. The union of two such matrices is obtained by applying the operation to entries of each pair of elements to obtain the corresponding matrix union.

In an embodiment, performing the maneuver includes positioning, by the control circuit 406, the AV 100 ahead of the two moving vehicles 193, 1504 while traversing the road segment 1500. The control circuit 406 is illustrated and described in more detail with reference to FIG. 4. For example, a constraint can specify that the AV 100 overtake the vehicle 1504 at a particular time and location. In an embodiment, performing the maneuver includes positioning, by the control circuit 406, the AV 100 behind two moving objects (e.g., the two moving vehicles 193, 1504) while traversing the road segment 1500. For example, a constraint can specify that the AV 100 remain behind the vehicle 193 at a particular time and location. As another example, a constraint can specify that the AV 100 wait for the vehicle 193 or a pedestrian 192 to clear the path of the AV 100 before proceeding further along the trajectory 1520.

In an embodiment, performing the maneuver includes positioning, by the control circuit 406, the AV 100 between two moving objects (the two moving vehicles 193, 1504) while traversing the road segment 1500. For example, a constraint can specify that the AV 100 proceed along the trajectory 1520 prior to the vehicle 193 or a pedestrian entering the lane 1512.

Figure 16:
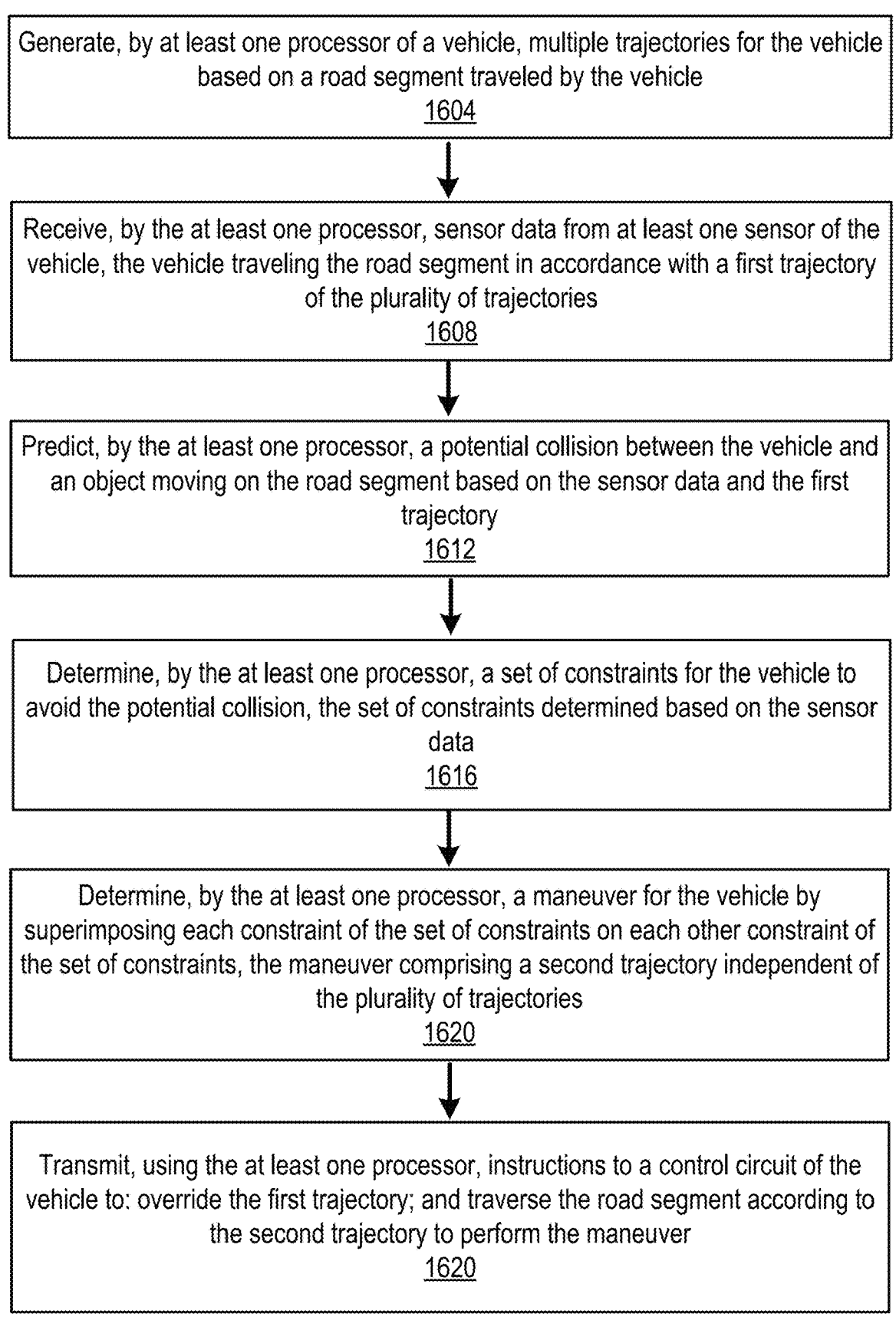
FIG. 16 is a flow diagram illustrating a process for operation of a vehicle, in accordance with one or more embodiments.

FIG. 16 is a flow diagram illustrating a process for operation of a vehicle, in accordance with one or more embodiments. The AV 100 is illustrated and described in more detail with reference to FIG. 1. In an embodiment, the process of FIG. 16 is performed by the homotopy extractor 453 or the sample-based maneuver realizer 454 of the AV 100, illustrated and described in more detail with reference to FIG. 4B. Other entities, for example, the server 136, perform some or all of the steps of the process in other embodiments. The server 136 is illustrated and described in more detail with reference to FIG. 1. Likewise, embodiments may include different and/or additional steps, or perform the steps in different orders.

The AV 100 uses at least one processor 146 of the AV 100 to generate (1604) multiple, initial trajectories based on a road segment 1500 (including lanes 1512, 1516) traveled by the AV 100. The processor 146 is illustrated and described in more detail with reference to FIG. 1. The lanes 1512, 1516 are illustrated and described in more detail with reference to FIG. 15. The process for trajectory generation is illustrated and described in more detail with reference to FIG. 10.

The AV 100 uses the processor 146 to receive (1608) sensor data 504*a* from at least one sensor 121 of the AV 100. The sensor 121 is illustrated and described in more detail with reference to FIG. 10. The LiDAR output data 504*a* is illustrated and described in more detail with reference to FIG. 5. The AV 100's use of sensor data is also described in more detail with reference to FIG. 4B. The AV 100 is traveling the road segment (lane 1516) in accordance with a trajectory 198 of the multiple trajectories. The trajectory 198 is illustrated and described in more detail with reference to FIG. 1.

The AV 100 uses the processor 146 to predict (1612) a potential collision between the AV 100 and an object 416 moving on the road segment 1500 based on the sensor data 504*a* and the trajectory 198. The object 416 is illustrated and described in more detail with reference to FIGS. 4, 15.

The AV 100 uses the processor 146 to determine (1616) a set of constraints 1302 for the AV 100 to avoid the potential collision. The set of constraints 1302 is illustrated and described in more detail with reference to FIG. 13. The set of constraints 1302 is determined based on the sensor data 504a. In an embodiment, the set of constraints includes hard logical constraints and soft logical constraints. Hard logical constraints are those that that the AV 100 must obey, for example, to avoid a potential collision or to reach the destination 199. The destination 199 is illustrated and described in more detail with reference to FIG. 1. Soft logical constraints are those that the AV 100 should obey but can violate, for example, to avoid a potential collision. Soft logical constraints are described in more detail with reference to FIG. 4B. For example, at least some of the set of constraints 1302 can be soft logical constraints (e.g., the AV 100 should try to but does not necessarily need to adhere to soft logical constraints while traversing to the destination 199).

The AV 100 uses the processor 146 to determine (1620) a maneuver for the AV 100 by superimposing each constraint of the set of constraints 1302 on each other constraint of the set of constraints 1302. The maneuver includes a trajectory 1520 independent of the multiple, initial trajectories. The trajectory 1520 is illustrated and described in more detail with reference to FIG. 15. In an embodiment, determining the maneuver includes generating, by the at least one processor 146, a union of the station-based constraints and the spatial-based constraints to provide the maneuver. For example, the union of the station-based constraints and the spatial-based constraints is an operation using which the station-based constraints and the spatial-based constraints are combined and related to each other.

The AV 100 uses the processor 146 to transmit (1624) instructions to a control circuit 406 of the AV 100. The control circuit 406 is illustrated and described in more detail with reference to FIG. 1. The instructions instruct the control circuit 406 to override the initial trajectory 198. The instructions further instruct the control circuit 406 to traverse the road segment 1500 according to the trajectory 1520 to perform the maneuver.

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further including," in the foregoing description or following claims, what follows this phrase can be an additional step or entity, or a sub-step/sub-entity of a previously-recited step or entity.

Additional Examples

Example implementations of the features described herein are provided below.

Example 1: A method includes: generating, by at least one processor of a vehicle, a plurality of trajectories for the vehicle based on a road segment traveled by the vehicle; receiving, by the at least one processor, sensor data from at least one sensor of the vehicle, the vehicle traveling the road segment in accordance with a first trajectory of the plurality of trajectories; predicting, by the at least one processor, a potential collision between the vehicle and an object moving on the road segment based on the sensor data and the first trajectory; determining, by the at least one processor, a set of constraints for the vehicle to avoid the potential collision, the set of constraints determined based on the sensor data; determining, by the at least one processor, a maneuver for the vehicle by superimposing each constraint of the set of constraints on each other constraint of the set of constraints, the maneuver including a second trajectory independent of the plurality of trajectories; and transmitting, by the at least one processor, instructions to a control circuit of the vehicle to: override the first trajectory; and traverse the road segment according to the second trajectory to perform the maneuver.

Example 2: The method of Example 1, where the set of constraints includes environmental constraints indicating at least one of a drivable area of the road segment or lane markings of the road segment.

Example 3: The method of any one of the preceding Examples, where the set of constraints includes: hard logical constraints that the AV must obey to avoid the potential collision; and soft logical constraints that the AV can violate to avoid the potential collision.

Example 4: The method of any one of the preceding Examples, where the set of constraints includes: station-based constraints that are parameterized, by the at least one processor, over time using the sensor data; and spatial-based constraints that are parameterized, by the at least one processor, over station and time using the sensor data.

Example 5: The method of any one of the preceding Examples, where determining the maneuver includes generating, by the at least one processor, a union of the station-based constraints and the spatial-based constraints to provide the maneuver.

Example 6: The method of any one of the preceding Examples, where determining the set of constraints is performed at a first frequency and determining the maneuver to generate the second trajectory is performed at a second frequency higher than the first frequency.

Example 7: The method of any one of the preceding Examples, where performing the maneuver includes operating the vehicle to a particular location relative to the object.

Example 8: The method of any one of the preceding Examples, the method also including determining, by the at least one processor, a plurality of homotopies, where each homotopy of the plurality of homotopies includes a different respective combination of the set of constraints, and where determining the maneuver is based on at least some of the plurality of homotopies.

Example 9: The method of any one of the preceding Examples, the method also including: predicting, by the at least one processor, a motion of the vehicle on the road segment according to a degree of precision; and determining, by the at least one processor, that the vehicle can traverse the road segment in accordance with a subset of the plurality of homotopies based on the predicted motion, where determining the maneuver is further based on the subset of the plurality of homotopies.

Example 10: The method of any one of the preceding Examples, where determining that the vehicle can traverse the road segment in accordance with the subset of the plurality of homotopies includes generating, by the at least one processor, a decision graph based on the subset of the plurality of homotopies, the decision graph including a plurality of nodes, each node corresponding to a different maneuver.

Example 11: The method of any one of the preceding Examples, where determining the maneuver to generate the second trajectory includes: assigning, by the at least one processor, a respective quality metric to each homotopy of the plurality of homotopies; and selecting, by the at least one processor, the second trajectory based on the respective quality metric.

Example 12: The method of any one of the preceding Examples, where the respective quality metric is determined based on at least one of: a predicted time for traversing the road segment in accordance with the each homotopy; a predicted safety of a passenger of the vehicle while traversing the road segment in accordance with the each homotopy; or a predicted comfort of the passenger while traversing the road segment in accordance with the each homotopy.

Example 13: The method of any one of the preceding Examples, where performing the maneuver includes positioning, by the control circuit, the vehicle ahead of two moving objects while traversing the road segment.

Example 14: The method of any one of the preceding Examples, where performing the maneuver includes positioning, by the control circuit, the vehicle behind two moving objects while traversing the road segment.

Example 15: The method of any one of the preceding Examples, where performing the maneuver includes positioning, by the control circuit, the vehicle between two moving objects while traversing the road segment.

Example 16: The method of any one of the preceding Examples, where superimposing each constraint of the set of constraints on each other constraint of the set of constraints includes sampling, by the at least one processor, each constraint of the set of constraints with respect to time in accordance with changes in the sensor data to provide the maneuver.

Example 17: A vehicle includes: one or more computer processors; and one or more non-transitory storage media storing instructions which, when executed by the one or more computer processors, cause the one or more computer processors to perform the method of any one of Examples 1-16.

Example 18: One or more non-transitory storage media storing instructions which, when executed by the one or more computer processors, cause the one or more computer processors to perform the method of any one of Examples 1-16.

What is claimed is:

1. A method comprising:
   generating, by at least one processor of a vehicle, a plurality of trajectories for the vehicle based on a road segment traveled by the vehicle;
   receiving, by the at least one processor, sensor data from at least one sensor of the vehicle, the vehicle traveling the road segment in accordance with a first trajectory of the plurality of trajectories;
   predicting, by the at least one processor, a potential collision between the vehicle and an object moving on the road segment based on the sensor data and the first trajectory;
   determining, by the at least one processor, a set of constraints for the vehicle to avoid the potential collision, the set of constraints determined based on the sensor data;
   determining, by the at least one processor, a maneuver for the vehicle by superimposing each constraint of the set of constraints on each other constraint of the set of constraints, the maneuver comprising a second trajectory independent of the plurality of trajectories; and
   transmitting, by the at least one processor, instructions to a control circuit of the vehicle to:
   override the first trajectory; and
   traverse the road segment according to the second trajectory to perform the maneuver.

2. The method of claim 1, wherein the set of constraints comprises environmental constraints indicating at least one of a drivable area of the road segment or lane markings of the road segment.

3. The method of claim 1, wherein the set of constraints comprises:
   hard logical constraints that the AV must obey to avoid the potential collision; and
   soft logical constraints that the AV can violate to avoid the potential collision.

4. The method of claim 1, wherein the set of constraints comprises:
   station-based constraints that are parameterized, by the at least one processor, over time using the sensor data; and
   spatial-based constraints that are parameterized, by the at least one processor, over station and time using the sensor data.

5. The method of claim 4, wherein determining the maneuver comprises:
   generating, by the at least one processor, a union of the station-based constraints and the spatial-based constraints to provide the maneuver.

6. The method of claim 1, wherein determining the set of constraints is performed at a first frequency and determining the maneuver to generate the second trajectory is performed at a second frequency higher than the first frequency.

7. The method of claim 1, wherein performing the maneuver comprises:
   operating the vehicle to a particular location relative to the object.

8. The method of claim 1, further comprising:
   determining, by the at least one processor, a plurality of homotopies, wherein each homotopy of the plurality of homotopies comprises a different respective combination of the set of constraints, wherein determining the maneuver is based on at least some of the plurality of homotopies.

9. The method of claim 8, further comprising:
   predicting, by the at least one processor, a motion of the vehicle on the road segment according to a degree of precision; and
   determining, by the at least one processor, that the vehicle can traverse the road segment in accordance with a subset of the plurality of homotopies based on the predicted motion, wherein determining the maneuver is further based on the subset of the plurality of homotopies.

10. The method of claim 9, wherein determining that the vehicle can traverse the road segment in accordance with the subset of the plurality of homotopies comprises:
    generating, by the at least one processor, a decision graph based on the subset of the plurality of homotopies, the decision graph comprising a plurality of nodes, each node corresponding to a different maneuver.

11. The method of claim 8, wherein determining the maneuver to generate the second trajectory comprises:
    assigning, by the at least one processor, a respective quality metric to each homotopy of the plurality of homotopies; and selecting, by the at least one processor, the second trajectory based on the respective quality metric.

12. The method of claim 11, wherein the respective quality metric is determined based on at least one of:
a predicted time for traversing the road segment in accordance with the each homotopy;
a predicted safety of a passenger of the vehicle while traversing the road segment in accordance with the each homotopy; or
a predicted comfort of the passenger while traversing the road segment in accordance with the each homotopy.

13. The method of claim 1, wherein performing the maneuver comprises:
positioning, by the control circuit, the vehicle ahead of two moving objects while traversing the road segment.

14. The method of claim 1, wherein performing the maneuver comprises:
positioning, by the control circuit, the vehicle behind two moving objects while traversing the road segment.

15. The method of claim 1, wherein performing the maneuver comprises:
positioning, by the control circuit, the vehicle between two moving objects while traversing the road segment.

16. The method of claim 1, wherein superimposing each constraint of the set of constraints on each other constraint of the set of constraints comprises:
sampling, by the at least one processor, each constraint of the set of constraints with respect to time in accordance with changes in the sensor data to provide the maneuver.

17. A vehicle comprising:
one or more computer processors; and
one or more non-transitory storage media storing instructions which, when executed by the one or more computer processors, cause the one or more computer processors to:
generate a plurality of trajectories for the vehicle based on a road segment traveled by the vehicle;
receive sensor data from at least one sensor of the vehicle, the vehicle traveling the road segment in accordance with a first trajectory of the plurality of trajectories;
predict a potential collision between the vehicle and an object moving on the road segment based on the sensor data and the first trajectory;
determine a set of constraints for the vehicle to avoid the potential collision, the set of constraints determined based on the sensor data;
determine a maneuver for the vehicle by superimposing each constraint of the set of constraints on each other constraint of the set of constraints, the maneuver comprising a second trajectory independent of the plurality of trajectories; and
transmit instructions to a control circuit of the vehicle to:
override the first trajectory; and
traverse the road segment according to the second trajectory to perform the maneuver.

18. The vehicle of claim 17, wherein the set of constraints comprises environmental constraints indicating at least one of a drivable area of the road segment or lane markings of the road segment.

19. One or more non-transitory storage media storing instructions which, when executed by one or more computer processors, cause the one or more computer processors to:
generate a plurality of trajectories for a vehicle based on a road segment traveled by the vehicle;
receive sensor data from at least one sensor of the vehicle, the vehicle traveling the road segment in accordance with a first trajectory of the plurality of trajectories;
predict a potential collision between the vehicle and an object moving on the road segment based on the sensor data and the first trajectory;
determine a set of constraints for the vehicle to avoid the potential collision, the set of constraints determined based on the sensor data;
determine a maneuver for the vehicle by superimposing each constraint of the set of constraints on each other constraint of the set of constraints, the maneuver comprising a second trajectory independent of the plurality of trajectories; and
transmit instructions to a control circuit of the vehicle to:
override the first trajectory; and
traverse the road segment according to the second trajectory to perform the maneuver.

20. The one or more non-transitory storage media of claim 1, wherein the set of constraints comprises environmental constraints indicating at least one of a drivable area of the road segment or lane markings of the road segment.

* * * * *

UNITED STATES PATENT AND TRADEMARK OFFICE
CERTIFICATE OF CORRECTION

| | | |
|---|---|---|
| PATENT NO. | : 12,030,485 B2 | Page 1 of 1 |
| APPLICATION NO. | : 17/544526 | |
| DATED | : July 9, 2024 | |
| INVENTOR(S) | : Juraj Kabzan and Emilio Frazzoli | |

It is certified that error appears in the above-identified patent and that said Letters Patent is hereby corrected as shown below:

On the Title Page

Column 2, item (56) (Other Publications), Delete "[No." and insert -- [No --.

In the Claims

Claim 20, Column 36, Line 42, Delete "1" and insert -- 19 --.

Signed and Sealed this
Twenty-second Day of October, 2024

Katherine Kelly Vidal
*Director of the United States Patent and Trademark Office*